US010557070B2

(12) United States Patent
Yang et al.

(10) Patent No.: US 10,557,070 B2
(45) Date of Patent: *Feb. 11, 2020

(54) HEAT TRANSFER FLUIDS AND CORROSION INHIBITOR FORMULATIONS FOR USE THEREOF

(71) Applicant: PRESTONE PRODUCTS CORPORATION, Danbury, CT (US)

(72) Inventors: Bo Yang, Ridgefield, CT (US); Aleksei Gershun, Southbury, CT (US); Peter M. Woyciesjes, Woodbury, CT (US)

(73) Assignee: PRESTONE PRODUCTS CORPORATION, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,224

(22) Filed: Jun. 11, 2018

(65) Prior Publication Data

US 2018/0291250 A1 Oct. 11, 2018

Related U.S. Application Data

(63) Continuation of application No. 15/276,010, filed on Sep. 26, 2016, now Pat. No. 9,994,755, which is a continuation-in-part of application No. 14/850,105, filed on Sep. 10, 2015, now Pat. No. 9,453,153, which is a continuation of application No. 14/087,796, filed on Nov. 22, 2013, now Pat. No. 9,145,613, which is a continuation of application No. 13/606,452, filed on Sep. 7, 2012, now Pat. No. 8,617,416.

(51) Int. Cl.
| C09K 5/00 | (2006.01) |
| C09K 5/20 | (2006.01) |
| C09K 5/10 | (2006.01) |
| C23F 11/08 | (2006.01) |

(52) U.S. Cl.
CPC .................. *C09K 5/20* (2013.01); *C09K 5/10* (2013.01); *C23F 11/08* (2013.01)

(58) Field of Classification Search
None
See application file for complete search history.

(56) References Cited

U.S. PATENT DOCUMENTS

| 3,198,820 A | 8/1965 | Pines et al. |
| 3,203,969 A | 8/1965 | Pines et al. |
| 3,248,329 A | 4/1966 | Pines et al. |
| 3,312,622 A | 4/1967 | Pines et al. |
| 3,337,496 A | 8/1967 | Pines et al. |
| 3,341,469 A | 9/1967 | Pines et al. |
| 4,093,641 A | 6/1978 | Plueddemann |
| 4,287,077 A | 9/1981 | Wing |
| 4,333,843 A | 6/1982 | Wing et al. |
| 4,352,742 A | 10/1982 | Davis et al. |
| 4,354,002 A | 10/1982 | Davis et al. |
| 4,362,644 A | 12/1982 | Davis et al. |
| 4,370,255 A | 1/1983 | Plueddemann |
| 4,517,110 A | 5/1985 | Suzuki et al. |
| 4,629,602 A | 12/1986 | Gousetis et al. |
| 4,701,277 A | 10/1987 | Mohr et al. |
| 4,772,408 A | 9/1988 | Mohr et al. |
| 5,018,577 A | 5/1991 | Pardue et al. |
| 5,338,477 A | 8/1994 | Chen et al. |
| 5,454,967 A | 10/1995 | Pfitzner et al. |
| 5,567,346 A | 10/1996 | Kakiuchi |
| 5,606,105 A | 2/1997 | Davis et al. |
| 5,741,436 A | 4/1998 | Gershun et al. |
| 5,766,506 A | 6/1998 | Mendoza et al. |
| 5,866,042 A | 2/1999 | Chen |
| 6,126,852 A * | 10/2000 | Turcotte .................... C09K 5/20 252/76 |
| 6,235,217 B1 | 5/2001 | Turcotte et al. |
| 6,391,257 B1 | 5/2002 | Woyciesjes |
| 6,398,984 B1 | 6/2002 | Maes et al. |
| 6,572,789 B1 | 6/2003 | Yang et al. |
| 7,588,694 B1 | 9/2009 | Bradshaw |
| 7,608,198 B2 | 10/2009 | Jeffcoate |
| 7,645,331 B2 | 1/2010 | Yang |
| 7,662,304 B2 | 2/2010 | Woyciesjes |
| 7,744,775 B2 * | 6/2010 | Yang ........................ C09K 5/20 106/14.05 |
| 7,820,066 B2 | 10/2010 | Jeffcoate |
| 7,854,253 B2 | 12/2010 | Woyciesjes |
| 7,985,349 B2 | 7/2011 | Yang |
| 8,216,383 B2 | 7/2012 | Yang |
| 2004/0104375 A1 | 6/2004 | Pellet et al. |
| 2004/0227124 A1 | 11/2004 | Turcotte et al. |
| 2006/0017044 A1 | 1/2006 | Zhang et al. |
| 2007/0034825 A1 | 2/2007 | Wenderoth |
| 2009/0266519 A1 | 10/2009 | Marinho |
| 2009/0294102 A1 | 12/2009 | Yang |
| 2010/0006796 A1 | 1/2010 | Yang |
| 2010/0059703 A1 | 3/2010 | Yang et al. |
| 2010/0116473 A1 * | 5/2010 | Yang ........................ C09K 5/20 165/134.1 |

FOREIGN PATENT DOCUMENTS

| CN | 1284984 | 2/2001 |
| CN | 1308663 | 8/2001 |
| CN | 1522289 | 8/2004 |
| CN | 10105055 | 10/2007 |
| CN | 102272260 | 12/2011 |
| EP | 0245557 | 11/1987 |
| EP | 1170347 | 1/2002 |
| GB | 2049650 | 12/1980 |
| GB | 2118159 | 10/1983 |
| JP | S56-000283 | 1/1981 |

(Continued)

OTHER PUBLICATIONS

1st Search Report and Office Action issued in App. No. CN201380046726.2 (dated Feb. 4, 2017).

(Continued)

*Primary Examiner* — Necholus Ogden, Jr.
(74) *Attorney, Agent, or Firm* — Barnes & Thornburg LLP; Gregory H. Zayia

(57) ABSTRACT

Heat transfer fluid concentrates include: a freezing point depressant, water, or a combination thereof; a carboxylate; an inorganic phosphate; an azole compound; calcium ions and/or magnesium ions; and a water-soluble polymer. Ready-to-use heat transfer fluids and methods for preventing corrosion in heat transfer systems are described.

24 Claims, No Drawings

(56) References Cited

FOREIGN PATENT DOCUMENTS

| | | |
|---|---|---|
| JP | S58-189380 | 11/1983 |
| JP | H08-20763 | 11/1996 |
| JP | H09-263976 | 10/1997 |
| JP | 3192430 | 7/2001 |
| JP | 2002-069676 | 3/2002 |
| JP | 2003-213465 | 7/2003 |
| JP | 2012-508297 | 4/2012 |
| RU | 2227175 | 4/2004 |
| RU | 2249634 | 4/2005 |
| RU | 2360939 | 7/2009 |
| WO | WO-2010054224 A2 * | 5/2010 |

OTHER PUBLICATIONS

2nd Search Report and Office Action issued in App. No. CN201380046726.2 (dated Sep. 26, 2017).
Final Office Action dated Mar. 12, 2015 in U.S. Appl. No. 14/087,796.
International Search Report and Written Opinion of PCT/US2013/56267 dated Sep. 13, 2013.
International Search Report and Written Opinion of PCT/US2013/56262 dated Oct. 16, 2013.
International Search Report and Written Opinion of PCT/US2013/56268 dated Sep. 19, 2013.
Non-final Office Action dated Dec. 1, 2014 in U.S. Appl. No. 14/087,796.
Non-final Office Action dated Mar. 15, 2013 in U.S. Appl. No. 13/606,516.
Non-final Office Action dated Mar. 15, 2013 in U.S. Appl. No. 13/606,452.
Non-final Office Action dated May 22, 2014 in U.S. Appl. No. 14/087,796.
Office Action issued in App. No. EP13836081.3 (dated Feb. 20, 2018).
Office Action issued in App. No. JP2015-531107 (dated Feb. 2, 2018).
Search Report and Office Action issued in App. No. JP 2015-531109 (dated Apr. 10, 2017).
Search Report and Office Action issued in App. No. RU2015112340 (dated Jul. 28, 2017).
Search Report and Opinion issued in App. No. EP13836081.3 (dated Mar. 18, 2016).
Wang et al., (Abstract) "A Brief Introduction to Antifreezing Fluid in Vehicle," *Science & Technology In Chemical Industry*, 9(5): 58-62 (Oct. 30, 2001).
U.S. Appl. No. 15/276,010, filed Sep. 26, 2016.
Office Action issued in Japanese App. No. 2015-531109 (dated Jan. 30, 2019).

* cited by examiner

HEAT TRANSFER FLUIDS AND CORROSION INHIBITOR FORMULATIONS FOR USE THEREOF

CROSS-REFERENCE TO RELATED APPLICATIONS

This application is a continuation of U.S. application Ser. No. 15/276,010, filed Jun. 12, 2018 (now U.S. Pat. No. 9,994,755), which is a continuation-in-part of U.S. application Ser. No. 14/850,105, filed Sep. 10, 2015 (now U.S. Pat. No. 9,453,153), which is a continuation of U.S. application Ser. No. 14/087,796, filed Nov. 22, 2013 (now U.S. Pat. No. 9,145,613), which is a continuation of U.S. application Ser. No. 13/606,452, filed Sep. 7, 2012 (now U.S. Pat. No. 8,617,416). The entire contents of every one of the above-identified documents are hereby incorporated herein by reference.

TECHNICAL FIELD

The present teachings relate generally to heat transfer fluids and, in some embodiments, to heat transfer fluids for inhibiting corrosion in heat transfer systems.

BACKGROUND

Modern vehicle engines may use a heat transfer fluid (e.g., liquid coolant) to provide long-lasting, year-round protection of their cooling systems. A key function of heat transfer fluids is to transfer excess heat from an engine to a radiator for dissipation. Efficient heat transfer and control of engine temperature leads to efficient fuel economy and lubrication, and may prevent engine failures due to freeze-up, boiling-over, or over-heating. Ideally, engine coolant may also serve to provide corrosion protection of cooling system metals (e.g., over a range of different temperature and operating conditions).

Common corrosion-related problems that may arise in automotive cooling systems include: (1) cavitation corrosion and rusting of cylinder heads and cylinder blocks; (2) seal leakage, bellows seal failure, and cavitation corrosion in water pumps; (3) solder bloom, scale and deposit formation, and pitting in radiators and heater cores; (4) thermostat sticking; and/or (5) crevice corrosion at hose necks. In addition, erosion-corrosion, galvanic corrosion, under-deposit corrosion, and/or stray-current corrosion may occur at susceptible locations in a cooling system depending on conditions.

Different kinds of metals may be used to fabricate the various parts of a cooling system. By way of example, cast iron and cast aluminum alloys may be used for cylinder blocks, cylinder heads, intake manifolds, coolant pumps, and power electronic device enclosures; wrought aluminum and copper alloys may be used for radiators and heater cores; solders may be used to join the components of brass or copper radiators or heater cores; steel may be used for cylinder head gaskets and for small components such as freeze plugs, coolant pump housing enclosures, and coolant pump impellers; and copper alloys may be used in thermostats.

Corrosion protection of components manufactured from aluminum or aluminum alloys (e.g., engine block, cylinder head, water pump, heat exchangers, and the like), corrosion protection of heat transfer system components produced by a controlled atmosphere brazing (CAB) process (e.g., heat exchangers), and corrosion protection at high temperature (e.g., in cooling systems for vehicles equipped with exhaust gas recirculation or EGR) are of particular interest.

SUMMARY

The scope of the present invention is defined solely by the appended claims, and is not affected to any degree by the statements within this summary.

By way of introduction, a first heat transfer fluid concentrate in accordance with the present teachings includes: (a) a freezing point depressant; (b) a carboxylate; (c) an inorganic phosphate; (d) an azole compound; (e) magnesium ions derived from magnesium oxide and/or magnesium hydroxide, or calcium ions derived from calcium oxide and/or calcium hydroxide, or a combination of magnesium ions derived from magnesium oxide and/or magnesium hydroxide and calcium ions derived from calcium oxide and/or calcium hydroxide; and (f) an acrylate-based polymer.

A second heat transfer fluid concentrate in accordance with the present teachings includes (a) ethylene glycol in an amount of 90 wt. % to 98 wt. % based on a total weight of the heat transfer fluid concentrate; (b) an aliphatic carboxylate in an amount of 1.5 wt. % to 7 wt. % based on the total weight of the heat transfer fluid concentrate; (c) phosphoric acid in an amount of 0.05 wt. % to 5 wt. % based on the total weight of the heat transfer fluid concentrate; (d) a tolyltriazole in an amount of 0.05 wt. % to 2 wt. % based on the total weight of the heat transfer fluid concentrate; (e) magnesium ions derived from magnesium oxide and/or magnesium hydroxide, or calcium ions derived from calcium oxide and/or calcium hydroxide, or a combination of magnesium ions derived from magnesium oxide and/or magnesium hydroxide and calcium ions derived from calcium oxide and/or calcium hydroxide; and (f) a polyacrylate.

A first ready-to-use heat transfer fluid in accordance with the present teachings includes water and a heat transfer fluid concentrate of a type described above. The heat transfer fluid concentrate is present in an amount ranging from about 40 vol. % to about 60 vol. % based on a total volume of the heat transfer fluid.

A second ready-to-use heat transfer fluid in accordance with the present teachings includes: (a) water; (b) a freezing point depressant in an amount of 1 wt. % to 90 wt. % based on a total weight of the heat transfer fluid; (c) a carboxylate in an amount of 0.5 wt. % to 8 wt. % based on the total weight of the heat transfer fluid; (d) an inorganic phosphate in an amount of 0.05 wt. % to 3 wt. % based on the total weight of the heat transfer fluid; (e) an azole compound in an amount of 0.005 wt. % to 2 wt. % based on the total weight of the heat transfer fluid; (f) magnesium ions derived from magnesium oxide and/or magnesium hydroxide, wherein the magnesium ions are present in an amount of 2 ppm to 60 ppm by weight of the heat transfer fluid, or calcium ions derived from calcium oxide and/or calcium hydroxide, wherein the calcium ions are present in an amount greater than 0.5 ppm by weight of the heat transfer fluid, or a combination of magnesium ions derived from magnesium oxide and/or magnesium hydroxide and calcium ions derived from calcium oxide and/or calcium hydroxide; and (g) an acrylate-based polymer.

A third ready-to-use heat transfer fluid in accordance with the present teachings includes: (a) water; (b) ethylene glycol in an amount of 30 wt. % to 90 wt. % based on a total weight of the heat transfer fluid; (c) an aliphatic carboxylate in an amount of 0.6 wt. % to 7 wt. % based on the total weight of the heat transfer fluid; (d) phosphoric acid in an amount of 0.07 wt. % to 0.35 wt. % based on the total weight of the heat transfer fluid; (e) a tolyltriazole in an amount of 0.007 wt. % to 1.5 wt. % based on the total weight of the heat transfer fluid; (f) calcium ions derived from a calcium salt of a calcium oxide and/or a calcium hydroxide, wherein the calcium ions are present in an amount of 0.5 ppm to 60 ppm by weight of the heat transfer fluid; (g) magnesium ions derived from a magnesium salt of a magnesium oxide and/or a magnesium hydroxide, wherein the magnesium ions are present in an amount of 4 ppm to 65 ppm by weight of the heat transfer fluid; and (h) a polyacrylate in an amount wherein a ratio of the polyacrylate to the magnesium ions is from 1 to 25.

A method in accordance with the present teachings for preventing corrosion in a heat transfer system includes contacting at least a portion of the heat transfer system with a heat transfer fluid of a type described above.

A heat transfer system embodying features of the present teachings includes a heat transfer fluid concentrate or heat transfer coolant as described herein and a heat transfer apparatus.

DETAILED DESCRIPTION

In accordance with the present teachings, heat transfer fluid concentrates and ready-to-use heat transfer fluids derived from heat transfer fluid concentrates (e.g., by dilution with water) exhibit a synergistic effect between the components of the formulation with respect to corrosion inhibition. As further described below, the synergistic heat transfer fluid concentrates and ready-to-use heat transfer fluids derived therefrom contain magnesium ions and/or calcium ions which, in some embodiments, are derived from oxide and/or hydroxide salts.

Surprisingly and unexpectedly, it has been discovered that use of oxides and/or hydroxides as the source for magnesium and/or calcium ions in a heat transfer fluid concentrate in accordance with the present teachings provides unexpected advantages. By way of example, these benefits may include improved corrosion protection. In addition, by deriving the ions from a hydroxide and/or an oxide compound as opposed to an acetate, the presence of potentially corrosive acetate ions may be avoided in the heat transfer fluid concentrate and any heat transfer fluids derived therefrom. Moreover, by deriving the ions from a hydroxide and/or an oxide compound as opposed to from an acetate, less water will be present as compared, for example, to the case in which the ions are derived from the hydrate from of magnesium acetate tetra hydrate and/or calcium monohydrate. Furthermore, the reduction in amount of water added may provide an additional benefit as manifested in a decrease in freezing point and an increase in boiling point of the resultant heat transfer fluids. The above-described reduction in amount of added water may be most pronounced in the case of ions derived from oxide compounds.

In some embodiments, as further described below, the synergistic heat transfer fluid concentrates and ready-to-use heat transfer fluids derived therefrom contain calcium ions (e.g., such as may be derived from one or more water-soluble calcium salts), and a synergistic effect is observed between calcium ions and a water-soluble polymer (e.g., an acrylate-based polymer), as shown by corrosion test data and storage test data. In some embodiments, the optimal performance is observed when a concentration of the calcium ions ranges from about 1 mg/L to about 60 mg/L based on a total weight of the heat transfer fluid concentrate, and/or when a ratio of active acrylate-based polymer concentration to the calcium ion concentration in the heat transfer fluid concentrate is greater than about 4 and less than about 110.

In some embodiments, as further described below, the synergistic heat transfer fluid concentrates and ready-to-use heat transfer fluids derived therefrom contain magnesium ions (e.g., such as may be derived from one or more water-soluble magnesium salts), and a synergistic effect is observed between magnesium ions and a water-soluble polymer (e.g., an acrylate-based polymer), as shown by corrosion test data and storage test data. In some embodiments, the optimal performance is observed when the ratio of acrylate-based polymer to magnesium ion (both in ppm or wt. %) in the heat transfer fluid concentrate is 1 to 25.

In some embodiments, as further described below, the synergistic heat transfer fluid concentrates and ready-to-use heat transfer fluids derived therefrom contain a combination of magnesium ions and calcium ions. In the case of a heat transfer fluid containing magnesium ions, results show that adding 1-15 ppm of calcium ions can ensure storage stability and good corrosion performance. The effect of calcium ions on the solubility of magnesium ions in the phosphate containing heat transfer fluid is particularly surprising. The highly insoluble nature of various calcium phosphate salts in aqueous solutions at pH between 7 and 9.5 would lead one of skill in the art to predict poor solubility due to solution thermodynamic considerations.

It is to be understood that elements and features of the various representative embodiments described below may be combined in different ways to produce new embodiments that likewise fall within the scope of the present teachings.

By way of general introduction, a heat transfer fluid concentrate in accordance with the present teachings includes: (a) a freezing point depressant (e.g., ethylene glycol); (b) a carboxylate; (c) an inorganic phosphate; (d) an azole compound; (e) magnesium ions derived from magnesium oxide and/or magnesium hydroxide, or calcium ions derived from calcium oxide and/or calcium hydroxide, or a combination of magnesium ions derived from magnesium oxide and/or magnesium hydroxide and calcium ions derived from calcium oxide and/or calcium hydroxide; and (f) a water-soluble polymer (e.g., an acrylate-based polymer).

Heat transfer fluid concentrates in accordance with the present teachings may include a freezing point depressant. Representative freezing point depressants suitable for use in a heat transfer fluid concentrate in accordance with the present teachings include but are not limited to alcohol and mixture of alcohols (e.g., monohydric alcohols, polyhydric alcohols, and mixtures thereof). Representative alcohols for use as freezing point depressants include but are not limited to methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylopropane, alkoxy alkanols (e.g., methoxyethanol), and the like, and combinations thereof.

In some embodiments, the freezing point depressant comprises an alcohol which, in some embodiments, is selected from the group consisting of ethylene glycol, 1,2-propylene glycol, 1,3-propanediol, glycerol, and a combination thereof. In some embodiments, a heat transfer fluid concentrate in accordance with the present teachings contains a glycol freezing point depressant. The concentration of freezing point depressant may vary depending on the application.

In some embodiments, the concentration of the freezing point depressant ranges from about 15 wt. % to about 99% wt. % based on the total weight of the heat transfer fluid concentrate. In other embodiments, the concentration of the freezing point depressant ranges from about 20 wt. % to about 98% wt. % based on the total weight of the heat transfer fluid concentrate. In further embodiments, the concentration of the freezing point depressant ranges from about 20 wt. % to about 96% wt. % based on the total weight of the heat transfer fluid concentrate.

Heat transfer fluid concentrates in accordance with the present teachings may include water in addition to, or as an alternative to, a freezing point depressant. Ready-to-use heat transfer fluids derived from heat transfer fluid concentrates (e.g., by dilution) typically contain water. In some embodiments, a heat transfer fluid concentrate in accordance with the present teachings that contains a freezing point depressant may be diluted with water to a 40 vol. % to 60 vol. % solution.

The type of water used in accordance with the present teachings is not restricted. However, in some embodiments, the water used in a heat transfer fluid concentrate and/or a heat transfer fluid in accordance with the present teachings includes de-ionized water, de-mineralized water, softened water, or a combination thereof. In some embodiments, a hardness of the water due to $CaCO_3$ is less than about 20 ppm. In other embodiments, an electrical conductivity of the water is less than about 300 μS/cm. In further embodiments, a hardness of the water due to $CaCO_3$ is less than about 20 ppm and an electrical conductivity of the water is less than about 300 μS/cm.

Heat transfer fluid concentrates in accordance with the present teachings may further include one or a plurality of carboxylates. As used herein, the term "carboxylate" is inclusive of carboxylic acid, salts thereof, and combinations of one or more carboxylic acids and one or more carboxylic acid salts. The carboxylate may include a single or multiple carboxyl groups and may be linear or branched. It is expressly contemplated that combinations of carboxylates may be used and such combinations are encompassed by the terms "carboxylate" and "carboxylic acid". In some embodiments, a carboxylate in accordance with the present teachings has from 6 to 20 carbon atoms. The carboxylate may be aliphatic, aromatic, or a combination of both. In some embodiments, a carboxylate in accordance with the present teachings consists of carbon, hydrogen, and oxygen and is free of non-oxygen heteroatoms. Representative aliphatic carboxylates for use in accordance with the present teachings include but are not limited to 2-ethyl hexanoic acid, hexanoic acid, heptanoic acid, octanoic acid, neodecanoic acid, decanoic acid, nonanoic acid, isoheptanoic acid, dodecanoic acid, sebacic acid, adipic acid, pimelic acid, suberic acid, azelaic acid, dodecanedioic acid, and/or the like, and combinations thereof. Representative aromatic carboxylates include but are not limited to benzoic acid, toluic acid (methylbenzoic acid), tert-butyl benzoic acid, alkoxy benzoic acid (e.g., methoxybenzoic acid, such as o-, p-, or m-anisic acid), salicylic acid, phthalic acid, isophthalic acid, terephthalic acid, phenylacetic acid, mandelic acid, 1,2,4-benzenetricarboxylic acid, and/or the like, and combinations thereof.

In some embodiments, the carboxylate use in a heat transfer fluid concentrate in accordance with the present teachings includes a plurality of carboxylates. In some embodiments, the carboxylate includes an aliphatic mono-carboxylate, an aliphatic di-carboxylate, an aromatic mono-carboxylate, an aromatic di-carboxylate, or a combination thereof. In some embodiments, the carboxylate includes one or a plurality of $C_6$-$C_{20}$ carboxylates, and each of the one or the plurality of $C_6$-$C_{20}$ carboxylates is individually selected from the group consisting of an aliphatic mono-carboxylate, an aliphatic di-carboxylate, an aromatic mono-carboxylate, an aromatic di-carboxylate, and a combination thereof. In some embodiments, the carboxylate includes 2-ethyl hexanoic acid, neodecanoic acid, or a combination thereof.

The concentration of carboxylate may vary depending on the application. In some embodiments, the carboxylate is present in an amount from about 1 wt. % to about 10 wt. % based on the total weight of the heat transfer fluid concentrate. Within this range, the amount can be greater than or equal to about 1.5 wt. %, and, in some embodiments, greater than or equal to about 2 wt. %. Also within this range, the amount may be less than or equal to about 7 wt. % and, in some embodiments, less than or equal to about 5 wt. %.

Heat transfer fluid concentrates in accordance with the present teachings may further include one or a plurality of inorganic phosphates. The inorganic phosphate used in accordance with the present teachings is configured to generate phosphate ions upon dissolution in an aqueous solution. Representative inorganic phosphates for use in accordance with the present teachings include but are not limited to orthophosphates such as phosphoric acid, alkali metal orthophosphates (e.g., sodium orthophosphate, potassium orthophosphate, etc.), other water-soluble alkaline metal phosphate salts, and/or the like, and combinations thereof. In some embodiments, an inorganic phosphate for use in accordance with the present teachings is selected from the group consisting of phosphoric acid, sodium orthophosphate, potassium orthophosphate, sodium pyrophosphate, potassium pyrophosphate, sodium polyphosphate, potassium polyphosphate, sodium hexametaphosphate, potassium hexametaphosphate, and/or the like, and combinations thereof. In some embodiments, the inorganic phosphate includes phosphoric acid and/or one or more additional orthophosphates including but not limited to alkali metal orthophosphates and/or other water-soluble alkaline metal phosphate salts.

The concentration of inorganic phosphate may vary depending on the application. In some embodiments, the phosphate ion is present in a heat transfer fluid concentrate in accordance with the present teachings in an amount of up to about 5 wt. %. In some embodiments, the phosphate ion concentration in a heat transfer fluid concentrate in accordance with the present teachings ranges from about 0.002 wt. % to about 5 wt. % based on the total weight of the heat transfer fluid concentrate. In some embodiments, the phosphate ion concentration in a heat transfer fluid concentrate in accordance with the present teachings ranges from about 0.05 wt. % to about 5 wt. % based on the total weight of the heat transfer fluid concentrate. In some embodiments, the phosphate ion concentration ranges from about 0.05 wt. % to about 3 wt. % based on the total weight of the heat transfer fluid concentrate. In some embodiments, the phosphate ion concentration ranges from about 0.01 wt. % to about 1 wt. % based on the total weight of the heat transfer fluid. In some embodiments, the inorganic phosphate may be present in the heat transfer fluid concentrate an amount of between about 0.10 wt. % and about 0.60 wt. % based on the total weight of the heat transfer fluid concentrate. Within this range, the amount may be greater than or equal to about 0.11 wt. % and, in some embodiments, greater than or equal to about 0.12 wt. %. Also within this range, the amount may be less than or equal to about 0.45 wt. % and, in some embodiments, less than or equal to about 0.40 wt. %.

Heat transfer fluid concentrates in accordance with the present teachings may further include one or a plurality of azole compounds. Representative azole compounds that may be used in accordance with the present teachings include but are not limited to benzotriazole, tolyltriazole, methyl benzotriazole (e.g., 4-methyl benzotriazole, 5-methyl benzotriazole), butyl benzotriazole, other alkyl benzotriazoles (e.g., alkyl group containing from 2 to 20 carbon atoms), mercaptobenzothiazole, thiazole, imidazole, benzimidazole, indazole, tetrazole, tetrahydrotolyltriazole, tetrahydrogenated benzotriazoles (e.g., 4,5,6,7-tetrahydrobenzotriazole), 4-methyl-1H-benzotriazole, 5-methyl-1H-benzotriazole, tetrahydrobenzotriazole, and/or the like, and combinations thereof. In some embodiments, the azole compound used in a heat transfer fluid concentrate in accordance with the present teachings includes a benzotriazole, a tolyltriazole, or a combination thereof.

Azole compounds used in accordance with the present teachings may be substituted or unsubstituted. Representative substituted azole compounds include but are not limited to substituted thiazoles, substituted imidazoles, substituted indazoles, substituted tetrazoles, and/or the like, and combinations thereof. As used herein, the term "substituted" refers to the optional attachment of one or more substituents onto a backbone structure (e.g., an alkyl backbone, an alkenyl backbone, a heterocyclic backbone, etc.). Representative substituents for use in accordance with the present teachings include but are not limited to hydroxyl, amino ($-NH_2$, $-NHR^a$, $-NR^aR^b$), oxy ($-O-$), carbonyl ($-CO-$), thiol, alkyl, alkenyl, alkynyl, alkoxy, halo, nitrile, nitro, aryl and heterocyclyl groups. These substituents can optionally be further substituted with 1-3 substituents. Examples of substituted substituents include but are not limited to carboxamide, alkylmercapto, alkylsulphonyl, alkylamino, dialkylamino, carboxylate, alkoxycarbonyl, alkylaryl, aralkyl, alkylheterocyclyl, heterocyclylaryl, haloalkyl, and the like.

The concentration of azole compound may vary depending on the application. In some embodiments, the amount of the azole compound ranges from about 0.01 wt. % to about 3 wt. % based on the total weight of the heat transfer fluid concentrate. Within this range, the azole compound may be present in an amount greater than or equal to about 0.05 wt. % and, in some embodiments, greater than or equal to about 0.1 wt. %. Also within this range, the azole compound may be present in an amount less than or equal to about 2 wt. % and, in some embodiments, less than or equal to about 1 wt. %.

In accordance with the present teachings, heat transfer fluid concentrates include at least one metal ion (e.g., a metal ion derived from a water-soluble metal salt, an insoluble or poorly water-soluble metal compound, a metal oxide, a metal hydroxide, and/or the like, and combinations thereof). In some embodiments, the metal ion may be derived from a water-soluble alkaline earth metal salt (e.g., a calcium salt and/or a magnesium salt), an alkaline earth metal compound (e.g., a calcium compound and/or a magnesium compound), an alkaline earth metal oxide (e.g., calcium oxide and/or magnesium oxide), an alkaline earth metal hydroxide (e.g., calcium hydroxide and/or magnesium hydroxide), a water-soluble alkali metal salt (e.g., a lithium salt), an alkali metal compound (e.g., a lithium compound), an alkali metal oxide (e.g., lithium oxide), an alkali metal hydroxide (e.g., lithium hydroxide), and/or a combination thereof.

In some embodiments, heat transfer fluid concentrates in accordance with the present teachings include magnesium ions derived from a water-soluble alkaline earth metal salt and/or an alkaline earth metal compound that provides a source of magnesium ions. In some embodiments, the magnesium ions are derived from magnesium oxide and/or magnesium hydroxide. In some embodiments, the magnesium ions are derived from one or a plurality of magnesium compounds or salts (e.g., one or more water-soluble magnesium salts). In some embodiments, the magnesium ions are derived from one or a plurality of water-soluble magnesium salts that are configured to at least partially disassociate in an aqueous solution at room temperature. In some embodiments, the one or the plurality of magnesium salts are configured to produce up to about 150 mg/L magnesium ions in the heat transfer fluid concentrate upon dissolution based on the total weight of the heat transfer fluid concentrate. In some embodiments, the magnesium compound is soluble in the heat transfer fluid. As used herein, the term "soluble" refers to a degree of dissolution whereby no particulate matter remains visible to the naked eye. In some embodiments, the magnesium ions are not derived from magnesium acetate and, in some embodiments, a heat transfer fluid in accordance with the present teachings is free of acetate ion.

In accordance with the present teachings, magnesium ions derived from magnesium oxide and/or magnesium hydroxide may be advantageous. However, other sources of magnesium ions—in addition to or as an alternative to magnesium oxide and/or magnesium hydroxide—are also contemplated for use. Representative magnesium compounds for use in accordance with the present teachings include but are not limited to inorganic magnesium compounds and magnesium salts of organic acids containing one or a plurality of carboxylic acid groups. Representative inorganic magnesium compounds include but are not limited to magnesium molybdate, magnesium hydroxide, magnesium oxide, magnesium tungstate, magnesium nitrate, magnesium sulfate, magnesium perchlorate, magnesium chloride, magnesium vanadate, and/or the like, hydrates of any of the aforementioned magnesium salts, and combinations thereof. Representative magnesium salts of organic acids include but are not limited to magnesium formate, magnesium acetate, magnesium propionate, magnesium polyacrylate, magnesium polymaleate, magnesium lactate, magnesium gluconate, magnesium glycolate, magnesium glucoheptonate, magnesium citrate, magnesium tartrate, magnesium glucarate, magnesium succinate, magnesium hydroxysuccinate, magnesium adipate, magnesium oxalate, magnesium malonate, magnesium sulfamate, magnesium salt of aliphatic tricarboxylic acid or aliphatic tetra-carboxylic acid, and/or the like, and combinations thereof.

In some embodiments, the magnesium compound may be a magnesium salt formed between magnesium ions and a phosphonate or a phosphinate, such as magnesium-PBTC salts (where PBTC is 2-phosphonobutane-1,2,4-tri-carboxylic acid), magnesium-HEDP salts (where HEDP is 1-hydroxethane-1,1-diphosphonic acid), magnesium-HPA salts (where HPA is hydroxyphosphono-acetic acid or 2-hydroxy phosphono acetic acid), magnesium phosphonosuccinic acid salts, magnesium-PSO salts (where PSO is mono-, bis-, and oligomeric phosphinosuccinic acid adduct mixtures as described in U.S. Pat. No. 6,572,789 B1), and/or the like, hydrates of the aforementioned salts, or combinations thereof.

The concentration of magnesium ion may vary depending on the application. In some embodiments, one or more magnesium compounds present in a heat transfer fluid concentrate are soluble in the heat transfer fluid concentrate. In some embodiments, the concentration of magnesium ion ($Mg^{2+}$) in a heat transfer fluid concentrate in accordance with the present teachings is between about 0 mg/L and about 200 mg/L (i.e., up to about 200 mg/L). In other embodiments, the concentration of $Mg^{2+}$ in a heat transfer fluid concentrate in accordance with the present teachings is between about 0 mg/L and about 150 mg/L (i.e., up to about 150 mg/L), between about 1 mg/L and about 100 mg/L, between about 0.1 mg/L and about 80 mg/L, between about 0.2 mg/L and about 40 mg/L, or between about 1 mg/L and about 50 mg/L (e.g., 1 mg/L and 25 mg/L). In further embodiments, the concentration of magnesium ion is between about 3 mg/L and about 80 mg/L. In other embodiments, the concentration of magnesium ion is between about 2 mg/L and about 35 mg/L. In further embodiments, the concentration of magnesium ion is between about 4 mg/L and about 30 mg/L.

In some embodiments of a heat transfer fluid concentrate in accordance with the present teachings, the magnesium compound is present in an amount such that the heat transfer fluid has a magnesium ion concentration of 16 to 80 parts per million by weight (ppm) of the heat transfer fluid concentrate. Within this range, the magnesium ion concentration can be greater than or equal to 20 ppm, or, more specifically, greater than or equal to 22 ppm. Also within this range, the magnesium ion concentration can be less than or equal to 75 ppm, or, more specifically, less than or equal to 70 ppm.

For some of the embodiments in which a heat transfer fluid concentrate in accordance with the present teachings further includes magnesium ions and the water-soluble polymer includes an acrylate-based polymer, the ratio of active acrylate-based polymer stabilizer concentration to magnesium ion concentration is between about 1 and about 25 and, in other embodiments is optionally greater than about 5 and less than about 25. Within this range, the ratio can be greater than or equal to 2 or, more specifically, greater than or equal to 3. Also within this range, the ratio can be less than or equal to 20, or, more specifically, less than or equal to 15. The ratio of acrylate ions is determined using the amount (the weight) of acrylate-based polymer dissolved in the concentrate. In some embodiments, the heat transfer fluid concentrate includes magnesium ions in a concentration ranging from about 3 mg/L to about 80 mg/L based on the total weight of the heat transfer fluid concentrate, the water-soluble polymer includes an acrylate-based polymer, and a weight ratio of the acrylate-based polymer to the magnesium ions ranges from about 1 to about 25 and, in other embodiments, is greater than about 5 and less than about 25.

In some embodiments, heat transfer fluid concentrates in accordance with the present teachings include calcium ions derived from a water-soluble alkaline earth metal salt and/or an alkaline metal compound that provides a source of calcium ions. In some embodiments, the calcium ions are derived from calcium oxide and/or calcium hydroxide. In some embodiments, the calcium ions are derived from one or a plurality of calcium compounds or salts (e.g., one or more water-soluble calcium salts). In some embodiments, the calcium ions are derived from one or a plurality of water-soluble calcium salts that are configured to at least partially disassociate in an aqueous solution at room temperature. In some embodiments, the one or the plurality of calcium salts are configured to produce between about 1 and about 60 mg/L calcium ions ($Ca^{2+}$) in the heat transfer fluid concentrate upon dissolution. In some embodiments, the calcium compound is soluble in the heat transfer fluid. In some embodiments, the calcium ions are not derived from calcium acetate and, in some embodiments, a heat transfer fluid in accordance with the present teachings is free of acetate ion.

In accordance with the present teachings, calcium ions derived from calcium oxide and/or calcium hydroxide may be advantageous. However, other sources of calcium ions—in addition to or as an alternative to calcium oxide and/or calcium hydroxide—are also contemplated for use. Representative calcium compounds for use in accordance with the present teachings include but are not limited to inorganic calcium compounds and calcium salts of organic acids containing one or a plurality of carboxylic acid groups. Representative inorganic calcium compounds include but are not limited to calcium hydroxide, calcium oxide, calcium molybdate, calcium vanadate, calcium tungstate, calcium perchlorate, calcium chloride, calcium nitrate, and/or the like, hydrates of any of the aforementioned salts, and combinations thereof. Representative calcium salts of organic acids include but are not limited to calcium acetate, calcium formate, calcium propionate, calcium polymaleate, calcium polyacrylate, calcium lactate, calcium gluconate, calcium glycolate, calcium glucoheptonate, calcium citrate, calcium tartrate, calcium glucarate, calcium succinate, calcium hydroxysuccinate, calcium adipate, calcium oxalate, calcium malonate, calcium sulfamate, calcium salts of aliphatic tricarboxylic acid, calcium salts of aliphatic tetracarboxylic acid, and/or the like, hydrates of any of the aforementioned calcium salts, and combinations thereof.

In some embodiments, the calcium compound may be a calcium salt formed between calcium ions and a phosphonate or a phosphinate, such as calcium-PBTC salts (where PBTC is 2-phosphonobutane-1,2,4-tricarboxylic acid), calcium-HEDP salts (where HEDP is 1-hydroxethane-1,1-diphosphonic acid), calcium-HPA salts (where HPA is hydroxyphosphono-acetic acid or 2-hydroxy phosphono acetic acid), calcium phosphonosuccinic acid salts, calcium-PSO salts (where PSO is mono-, bis- and oligomeric phosphinosuccinic acid adduct mixtures as described in U.S. Pat. No. 6,572,789 B1), and/or the like, and combinations thereof.

The concentration of calcium ion ($Ca^{2+}$) may vary depending on the application. In some embodiments, one or more calcium compounds present in a heat transfer fluid concentrate are soluble in the heat transfer fluid concentrate. In some embodiments, the concentration of $Ca^{2+}$ in a heat transfer fluid concentrate in accordance with the present teachings is between about 0 mg/L and about 200 mg/L (i.e., up to about 200 mg/L). In other embodiments, the concentration $Ca^{2+}$ in a heat transfer fluid concentrate in accordance with the present teachings is between about 0.1 mg/L and about 150 mg/L, between about 0.1 mg/L and about 80 mg/L, between about 0.2 mg/L and about 60 mg/L, 0.2 mg/L and about 40 mg/L, or between about 1 mg/L and about 60 mg/L. In further embodiments, the concentration of calcium ion is between about 3 mg/L and about 40 mg/L. In still further embodiments, the concentration of calcium ion is between about 4 mg/L and about 30 mg/L.

The calcium compound is present in an amount such that the heat transfer fluid concentrate has a calcium ion concentration of greater than 0.5 parts per million, based on the total weight of the heat transfer fluid. Within this range, the amount of calcium ions can be less than 20 ppm. Also within this range, the amount of calcium ions can be less than or equal to 10 ppm.

In some embodiments, heat transfer fluid concentrates in accordance with the present teachings may include lithium ions. In some embodiments, the lithium ions are derived from lithium oxide and/or lithium hydroxide. In some embodiments, the lithium ions are derived from one or a plurality of lithium compounds or salts (e.g., one or more water-soluble lithium salts). In some embodiments, the lithium ions are derived from one or a plurality of water-soluble lithium salts that are configured to at least partially disassociate in an aqueous solution at room temperature. In some embodiments, the one or the plurality of lithium salts are configured to produce lithium ion in a concentration ranging from about 0 ppm to about 6000 ppm (i.e., up to about 6000 ppm) in the heat transfer fluid concentrate upon dissolution based on the total weight of the heat transfer fluid concentrate. In some embodiments, the lithium compound is soluble in the heat transfer fluid. In some embodiments, the lithium ions are not derived from lithium acetate and, in some embodiments, a heat transfer fluid in accordance with the present teachings is free of acetate ion.

In accordance with the present teachings, lithium ions derived from lithium oxide and/or lithium hydroxide may be advantageous. However, other sources of lithium ions—in addition to or as an alternative to lithium oxide and/or lithium hydroxide—are also contemplated for use. Representative lithium compounds for use in accordance with the present teachings include but are not limited to inorganic lithium compounds and lithium salts of organic acids containing one or a plurality of carboxylic acid groups. Representative inorganic lithium compounds include but are not limited to lithium hydroxide, lithium oxide, lithium phosphate, lithium borate, lithium perchlorate, lithium sulfate, lithium molybdate, lithium vanadate, lithium tungstate, lithium carbonate, and/or the like, hydrates of any of the aforementioned lithium salts, and combinations thereof. Representative lithium salts of organic acids include but are not limited to lithium acetate, lithium benzoate, lithium polyacrylate, lithium polymaleate, lithium lactate, lithium citrate, lithium tartrate, lithium gluconate, lithium glucoheptonate, lithium glycolate, lithium glucarate, lithium succinate, lithium hydroxyl succinate, lithium adipate, lithium oxalate, lithium malonate, lithium sulfamate, lithium formate, lithium propionate, and/or the like, and combinations thereof.

In some embodiments, the lithium compound may be a lithium salt formed between lithium ions and a phosphonate or a phosphinate, such as lithium-PBTC salts (where PBTC is 2-phosphonobutane-1,2,4-tricarboxylic acid), lithium-HEDP salts (where HEDP is 1-hydroxethane-1,1-diphosphonic acid), lithium-HPA salts (where HPA is hydroxyphosphono-acetic acid or 2-hydroxy phosphono acetic acid), lithium phosphonosuccinic acid salts, lithium-PSO salts (where PSO is mono-, bis-, and oligomeric phosphinosuccinic acid adduct mixtures as described in U.S. Pat. No. 6,572,789 B1), and/or the like, hydrates of the aforementioned salts, or combinations thereof.

The concentration of lithium ion may vary depending on the application. In some embodiments, one or more lithium compounds present in a heat transfer fluid concentrate are soluble in the heat transfer fluid concentrate. In some embodiments, the concentration of lithium ion ($Li^+$) in a heat transfer fluid concentrate in accordance with the present teachings is between about 0 ppm and about 6000 ppm (e.g., between about 0 ppm and about 5000 ppm) based on the total weight of the heat transfer fluid concentrate. Within this range, the lithium ion concentration may be less than about 4000 ppm and, in some embodiments, less than or equal to about 3000 ppm. Also within this range, the lithium ion concentration may be greater than or equal to about 50 ppm and, in some embodiments, greater than or equal to about 100 ppm, and in other embodiments greater than or equal to about 200 ppm.

The lithium compound can be present in an amount such that the heat transfer fluid concentrate has a lithium ion concentration of 50 to 2000 parts per million by weight (ppm) of the heat transfer fluid. Within this range, the lithium ion concentration can be less than or equal to 1500 ppm, or more specifically, less than or equal to 1000 ppm. Also within this range, the lithium ion concentration can be greater than or equal to 60 ppm, or more specifically, greater than or equal to 65 ppm.

Heat transfer fluid concentrates in accordance with the present teachings may further include one or a plurality of water-soluble (polyelectrolyte) polymers.

Illustrative examples of water-soluble polymers suitable for use in a heat transfer fluid concentrate in accordance with the present teachings include water-soluble polymers such as polyelectrolyte dispersants derived from a polymerizable monomer. The polymerizable monomer contains at least one group selected from the group consisting of unsaturated carboxylic acids or salts, unsaturated amides, unsaturated acid anhydrides, unsaturated nitriles, unsaturated carbonyl halides, unsaturated carboxylate esters, unsaturated ethers, unsaturated alcohols, unsaturated sulfonic acids or salts, unsaturated phosphonic acids or salts, unsaturated phosphinic acids or salts, and/or the like, and combinations thereof.

In some embodiments, water-soluble polymers suitable for use in a heat transfer fluid concentrate in accordance with the present teachings include homopolymers, copolymers, terpolymers, and inter-polymers having (1) at least one monomeric unit containing a $C_3$ to $C_{16}$ monoethylenically unsaturated mono- or dicarboxylic acid or their alkali metal or ammonium salts; or (2) at least one monomeric unit containing a $C_3$ to $C_{16}$ monoethylenically unsaturated mono- or dicarboxylic acid derivative such as an amide, nitrile, carboxylate ester, acid halide (e.g., acid chloride), acid anhydride, and/or the like, and combinations thereof. In some embodiments, a water-soluble polymer suitable for use in accordance with the present teachings may include at least 5% mer units of (1) or (2).

Representative monocarboxylic acids suitable for use in making water-soluble polymers that may be used in a heat transfer fluid concentrate in accordance with the present teachings include but are not limited to acrylic acid, methacrylic acid, ethyl acrylic acid, vinylacetic acid, allylacetic acid, and crotonic acid.

Representative monocarboxylic acid esters suitable for use in making water-soluble polymers that may be used in a heat transfer fluid concentrate in accordance with the present teachings include but are not limited to butyl acrylate, n-hexyl acrylate, t-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, methyl acrylate, methyl methacrylate, tertiary butylacrylate, and vinyl acetate.

Representative dicarboxylic acids suitable for use in making water-soluble polymers that may be used in a heat transfer fluid concentrate in accordance with the present teachings include but are not limited to maleic acid, itaconic acid, fumaric acid, citaconic acid, mesaconic acid, and methylenemalonic acid.

Representative amides suitable for use in making water-soluble polymers that may be used in a heat transfer fluid concentrate in accordance with the present teachings include but are not limited to acrylamide (or 2-propenamide), methacrylamide, ethyl acrylamide, propyl acrylamide, N-t-butylacrylamide, tertiary butyl methacrylamide, tertiary octyl acrylamide, N,N-dimethylacrylamide (or N, N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem and carboxymethylacrylamide.

Representative anhydrides suitable for use in making water-soluble polymers that may be used in a heat transfer fluid concentrate in accordance with the present teachings include but are not limited to maleic anhydride (or 2, 5-furandione) and succinic anhydride.

Representative nitriles suitable for use in making water-soluble polymers that may be used in a heat transfer fluid concentrate in accordance with the present teachings include but are not limited to acrylonitrile and methacrylonitrile.

Representative acid halides suitable for use in making water-soluble polymers that may be used in a heat transfer fluid concentrate in accordance with the present teachings include but are not limited to acrylamidopropyltrimethylammonium chloride, diallyldimethylammonium chloride, and methacrylamidopropyltrimethylammonium chloride.

In some embodiments, a water-soluble polymer for use in a heat transfer fluid concentrate accordance with the present teachings contains at least one monomeric unit selected from the group consisting of allylhydroxypropylsulfonate, AMPS or 2-acrylamido-2-methylpropane sulfonic acid, polyethyleneglycol monomethacrylate, vinyl sulfonic acid, styrene sulfonic acid, acrylamidomethyl propane sulfonic acid, methallyl sulfonic acid, allyloxybenzenesulfonic acid, 1,2-dihydroxy-3-butene, allyl alcohol, allyl phosphonic acid, ethylene glycoldiacrylate, aspartic acid, hydroxamic acid, 2-ethyl-oxazoline, adipic acid, diethylenetriamine, ethylene oxide, propylene oxide, ammonia, ethylene diamine, dimethylamine, diallyl phthalate, 3-allyloxy-2-hydroxy propane sulfonic acid, polyethylene glycol monomethacrylate, sodium styrene sulfonate, an alkoxylated allyl alcohol sulfonate, and/or the like, and combinations thereof.

In some embodiments, the water-soluble polymer suitable for use in a heat transfer fluid concentrate in accordance with the present teachings contains at least 5 mole % of mer units (e.g., as polymerized units) resulting from the polymerization of one or more monomers selected from the group consisting of (a) acrylic acid, methacrylic acid, crotonic acid, vinyl acetic acid, 4-methyl-4 penenoic acid, maleic acid, maleic anhydride, 1,2,3,6-tetrahydrophthalic anhydride, 3,6-epoxy-1, 2,3,6-tetrahydrophthalic anhydride, 5-norbornene-2,3-dicarboxylic anhydride, bicycle[2,2,2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, methylenemalonic acid, fumaric acid, citraconic acid, 2-acrylamido-2-methylpropanesulfonic acid, 3-allyloxy-2-hydroxy propane sulfonic acid, allyl phosphonic acid, allyloxybenzenesulfonic acid, 2-hydroxy-3-(2-propenyloxy)propanesulfonic acid, allylsulfonic acid, other acrylamidomethyl propane sulfonic acids, methallyl sulfonic acid, isopro-phenylsulfonic acid, vinylphosphonic acid, styrenesulfonic acid, vinylsulfonic acid, aspartic acid, hydroxamic acid, adipic acid, and the alkali metal or ammonium salts of any of the foregoing; (b) methyl acrylate, ethyl acrylate, butyl acrylate, n-hexyl acrylate, methyl methacrylate, ethyl methacrylate, butyl methacrylate, isobutyl methacrylate, t-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, tertiary butylacrylate, polyethyleneglycol monomethacrylate, phosphoethyl methacrylate, and vinyl acetate; (c) acrylamide (or 2-propenamide), methacrylamide, ethyl acrylamide, propyl acrylamide, N-t-butylacrylamide, tertiary butyl methacrylamide, tertiary octyl acrylamide, N-methylacrylamide, N,N-dimethylacrylamide (or N, N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem, and carboxymethylacrylamide; (d) maleic anhydride (or 2, 5-furandione) and succinic anhydride; acrylonitrile, and methacrylonitrile; (e) acrylamidopropyltrimethylammonium chloride, diallyldimethylammonium chloride, and methacrylamidopropyltrimethylammonium chloride; (f) 1,2-dihydroxy-3-butene, allyl alcohol, ethylene glycoldiacrylate, 2-ethyl-oxazoline, diethylenetriamine, ethylene oxide, propylene oxide, ammonia, styrene, ethylene diamine, dimethylamine, diallyl phthalate, polyethylene glycol monomethacrylate, sodium styrene sulfonate, and an alkoxylated allyl alcohol sulfonate; and (g) combinations thereof.

In some embodiments, a representative alkoxylated allyl alcohol sulfonate monomer for use in preparing a water-soluble polymer in accordance with the present teachings has the following structure (1):

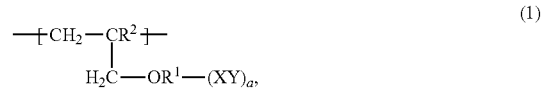

(1)

wherein $R^1$ is a hydroxyl substituted alkyl or alkylene radical having 1 to about 10 carbon atoms, or $R^1$ is a non-substituted alkyl or alkylene radical having 1 to about 10 carbon atoms, or $R^1$ is —$(CH_2—CH_2—O)_n$—, —$[CH_2—CH(CH_3)—O]_n$—, or combination thereof; wherein "n" is an integer from about 1 to about 50; wherein $R^2$ is H or a lower alkyl ($C_1$-$C_3$) group; wherein X, when present, is an anionic radical selected from the group consisting of —$SO_3$, —$PO_3$, —$PO_4$, and —COO; wherein Y, when present, is H or any water-soluble cation or cations which together counterbalance the valance of the anionic radical; and wherein a is 0 or 1. In some embodiments, a=1.

Representative water-soluble polyelectrolyte polymers suitable for use in a heat transfer fluid concentrate in accordance with the present teachings may, in some embodiments, have a molecular weight (MW) ranging from about 200 Daltons to about 200,000 Daltons. In other embodiments, suitable water-soluble polyelectrolyte polymer dispersants have a molecular weight (MW) ranging from about 500 Daltons to about 20,000 Daltons.

Illustrative water-soluble polyelectrolyte polymers suitable for use in a heat transfer fluid concentrate in accordance with the present teachings include but are not limited to polycarboxylates. Representative polycarboxylates include but are not limited to (1) polyacrylic acids or polyacrylates, acrylate-based polymers, copolymers, terpolymers, and quad-polymers such as acrylate/acrylamide copolymers, acrylate/AMPS (acrylamido methylene sulfonic acid or 2-acrylamido-2-methyl-1-propanesulfonic acid) or acrylamidoalkane sulfonic acid copolymers, acrylate/sulfonate copolymers, acrylate/hydroxyalkyl acrylate copolymers, acrylate/alkyl acrylate copolymers, acrylate/AMPS/alkyl acrylamide terpolymers, acrylate/acrylamidoalkane sulfonic acid/styrene sulfonic acid (or water-soluble salts) terpolymers, acrylate/acrylamide/sulfoalkylacrylamide terpolymers, acrylic acid/allyloxy-2-hydroxypropylsulfonic acid (AHPSE)/polyethyleneglycol allyl ether terpolymer, acrylate/methacrylate methyl ester/2-propane-1-sulfonic acid, 2-methyl-, sodium salt/bezenesulfonic acid, 4-[(2-methyl-2-propenyl)oxy]-, sodium salt quad-polymers; (2) polymethacrylic acids or polymethacrylates, methacrylate-based polymers, copolymers, terpolymers, and quad-polymers, where one monomer of the corresponding acrylate-based polymers listed in (1) is replaced by methacrylate or methacrylic acid; (3) polymaleic acid or maleic anhydride polymers, maleic acid based polymers, their copolymers, terpolymers and quad-polymers, where one monomer of the corresponding acrylate-based polymers listed in (1) is replaced by maleic acid or maleic anhydride; (4) polyacrylamides, modified acrylamide-based polymers, and acrylamide-based copolymers, terpolymers and quad-polymers, where one monomer of the corresponding acrylate-based polymers listed in (1) is replaced by acrylamide; (5) sulfonic acid-based copolymers, terpolymers and quad-polymers or their water-soluble salts; phosphonic acid-based copolymers, terpolymers and quad-polymers or their water-soluble salts; phosphinic acid-based copolymers, terpolymers and quad-polymers or their water-soluble salts; (6) vinylpyrrolidone-based homopolymers, and copolymers; (7) alkylene oxide-based copolymers and terpolymers; and combinations comprising one or more of the foregoing.

A water-soluble polymer for use in a heat transfer fluid concentrate in accordance with the present teachings may also be either a polyether polyamino methylene phosphonate as described in U.S. Pat. No. 5,338,477 or a phosphino polyacrylate acid.

Representative examples of commercially available polymers suitable for use as water-soluble polyelectrolyte polymers in a heat transfer fluid concentrate in accordance with the present teachings include but are not limited to (a) the Good-Rite® K-700 series of polymers shown in Table 1 available from Noveon (or Lubrizol), (b) the polymers shown in Table 2 available from AkzoNoble, and (c) the polymers shown in Table 3 available from Dow (Rohm & Haas).

TABLE 1

Representative Good-Rite ® K-700 series of polymers

| Good-Rite ® Polymer Technical Data Sheet | Chemical Type | Nominal Molecular Weight | pH | Total Solids | Active Solids |
|---|---|---|---|---|---|
| K-702 | PAA | 240,000 | 2.5 | 25% | 24.70% |
| K-7028 | PAA | 2,000 | 3.6 | 55% | 51.70% |
| K-7058 | PAA | 5,000 | 2.5 | 50% | 49.20% |
| K-7058N | NaPAA | 5,000 | 7 | 45% | 35.70% |
| K-7058D | NaPAA | 5,000 | 7.5* | 100%** | 70% |
| K-7600N | NaPAA | 60,000 | 8.2 | 33% | 25.70% |
| K-732 | PAA | 5,000 | 2.6 | 50% | 49.50% |
| K-739 | NaPAA | 5,000 | 7.5* | 100%** | 70.10% |
| K-752 | PAA | 2,000 | 2.6 | 63% | 62.20% |
| K-759 | NaPAA | 2,000 | 7.5* | 100%** | 71.50% |
| K-765 | NaPMAA | 30,000 | 7 | 30% | 24.30% |
| K-766 | NaPMAA | 5,000 | 7 | 40% | 30.10% |
| K-776 | AA/SA | N.P. | 4.8 | 37% | 30.60% |
| K-775 | AA/SA | N.P. | 3.5 | 50% | 48% |
| K-781 | AA/SA/SS | N.P. | 2.8 | 55% | 52.80% |
| K-797 | AA/SA/SS | N.P. | 2.7 | 50% | 48.50% |
| K-797D | Na(AA/SA/SS) | N.P. | 8.2* | 100%** | 74.30% |
| K-798 | AA/SA/SS | N.P. | 2.8 | 50% | 48% |
| K-XP212 | Proprietary | N.P. | 4 | 40% | 39.20% |

PAA = Polyacrylate
NaPAA = Sodium Polyacrylate,
NaPMAA = Sodium Polymethacrylate
AA = Acrylic Acid,
SA = Sulfonic Acid or AMPS,
SS = Sodium Styrene Sulfonate
"Active Solids" = "Total Solids" − "Counter Ions" (sodium) from post-polymerization neutralization with NaOH
*pH of a 1% solution
**Includes moisture content
N.P. = Not published

TABLE 2

Representative AQUATREAT Industrial Water Treatment Polymers available from AkzoNoble.

| Product | Total Solids | pH | Mw |
|---|---|---|---|
| Polyacrylic Acid | | | |
| AR-4 | 25 | 2.1 | 60000 |
| AR-6 | 25 | 2.3 | 100000 |
| AR-260 | 50 | 3.2 | 2000 |
| AR-602A | 50 | 2.8 | 4500 |
| AR-900A | 50 | 2.9 | 2600 |
| AR-921A | 50 | 2.6 | 3000 |
| AR-935 | 35 | 3.5 | 2500 |
| Sodium Polyacrylate | | | |
| AR-602N | 45 | 7.5 | 4500 |
| AR-636 | 45 | 7.5 | 5000 |
| AR-900[1] | 33 | 5.5 | 2600 |
| AR-940[1] | 40 | 8.3 | 2600 |
| Sodium Polymethacrylate | | | |
| AR-231 | 30 | 8.5 | 6500 |
| AR-232 | 30 | 8.5 | 9500 |
| AR-241 | 40 | 7 | 6500 |
| Copolymer | | | |
| AR-335 | 49 | 7.2 | 3400 |
| AR-540 | 44 | 4.3 | 10000 |
| AR-545 | 44 | 4.4 | 5000 |
| AR-546 | 37 | 4.8 | 9900 min |
| AR-978 | 42 | 5 | 4500 |
| AR-980 | 41 | 6.4 | 2800 |
| Sulfonated Styrene Maleic Anhydride | | | |
| VERSA-TL 3 | 95 | 7 | 20000 |
| VERSA-TL 4 | 25 | 7 | 20000 |

Notes:
AR-335 is polyacrylamide; AR-545 and AR-546 are AA/AMPS copolymers; Aquatreat AR-540 is an Acrylic acid (AA)/2-propenoic acid, 2-methyl, methyl ester/benzenesulfonic acid, 4-[(2-methyl-2-propenyl)oxy]-, sodium salt/2-propene-1-sulfonic acid, 2-methyl-, sodium salt terpolymer. Versa TL-4 = sulfonated styrene/maleic anhydride copolymer. Versa TL-3 is the dry form of Versa TL-4. AR-978 is acrylic acid/maleic acid copolymer. AR-980 is an acrylic acid/maleic acid/Nonionic monomer terpolymer.

TABLE 3

Polymers available from Dow (Rohm & Haas).

| Product Name | Chemical Nature | Molecular Weight | % Solids | pH |
|---|---|---|---|---|
| Acumer ® 1000/ Optidose ™ 1000 | Polyacrylic acid and its Na salts | 2,000 | 47-49 | 3.2-4.0 |
| Acumer ® 1020 | Polyacrylic acid | 2,000 | 39-41 | 2.1-2.5 |
| Acumer ® 1100 | Polyacrylic acid and its Na salts | 4,500 | 47-49 | 3.2-4.0 |
| Acumer ® 1110 | Polyacrylic acid and its Na salts | 4,500 | 44-46 | 6.7 |
| Acumer ® 1050 | Polyacrylic acid and its Na salts | 2,000-2,300 | 47-49 | 3.2-4.0 |
| Acumer ® 1510 | Na Salt of Polycarboxylate | 60,000 | 24-26 | 2 |
| Acumer ® 1808 | Na Salt of Polycarboxylate | 30,000 | 21-22 | 3.5-5.0 |
| Acumer ® 1850 | Na Salt of Polycarboxylate | 30,000 | 29-31 | 9.0-10.8 |
| Acumer ® 2000/ Optidose ™ 2000 | Modified Polycarboxylate | 4,500 | 42.5-43.5 | 3.8-4.6 |
| Acumer ® 2100 | Copolymer | 11,000 | 36.5-37.5 | 4.3-5.3 |
| Acumer ® 3100/ Optidose ™ 3100 | Carboxylate/Sulfonate/Nonionic Terpolymer | 4,500 | 43-44 | 2.1-2.6 |
| Acumer ® 4161 | Phosphinopolycarboxylic Acid | 3,300-3,900 | 46-48 | 3.0-3.5 |
| Optidose ™ 4210 | Polymaleic Acid | 500-1,000 | 50 | 1.0-2.0 |
| Acumer ® 5000 | Proprietary Polymer | 5,000 | 44.5-45.5 | 2.1-2.6 |
| Tamol ® 850 | Na Salt of Polycarboxylate | 30,000 | 29-31 | 9.0-10.8 |
| Tamol ® 731A | Maleic Anhydride Na Salt Copolymer | 15,000 | 24-26 | 9.5-10.5 |
| Tamol ® 960 | Na Salt of Polycarboxylate | 5,000 | 39-41 | 8-9 |

Note:
Acumer 2000 and 2100 are carboxylic acid/sulfonic acid copolymers (i.e., AA/AMPS copolymers); Acumer 3100 and Acumer 5000 are acrylic acid/t-butyl acrylamide/2-acrylamido-2-methyl propane sulfonic acid terpolymers. Optidose 1000, 2000 and Optidose 3100 are tagged versions of Acumer 1000, 2000, and 3100, respectively.

In some embodiments, a water-soluble polymer suitable for use in a heat transfer fluid concentrate in accordance with the present teachings is selected from the following commercially-available polymers: (1) polymers available from BASF under the SOKALAN and TAMOL brands, including but not limited to Sokalan CP 9 (maleic acid based polymer), Sokalan CP 10, 10S, 12S (all are acrylate-based polymers), 13S, Sokalan HP 22 G, HP 25, HP 59 and HP165 (polyvinylpyrrolidone), Solakan PA 15, PA 20, PA 25 Cl, PA 30 Cl, PA 40, Sokalan PM 10 I, PM 70, Tamol VS, and other similar products; (2) polymers available from Cytec under the CYANAMER brand including but not limited to P-35, P-70, P-80, A-100L and A-15 (all are acrylate- or acrylamide-based polymers or copolymers) and the like; (3) polymers available from Biolab additives under the BLECLENE and BELSPERSE brands, including but not limited to Beclene 200 (maleic acid homopolymer), 283 (maleic acid terpolymer), 400 (sulfonated phosphino polycarboxylic acid) and 499 (sulfonated phosphono polycarboxylic acid); and Belsperse 161 (phosphino polycarboxylic acid) and 164 (phosphino polycarboxylic acid), and the like and (4) water-soluble polymeric products available from Nalco (e.g., acrylic acid/2-acrylamido-2-methylpropyl sulfonic acid copolymers, polyether polyamino phosphonate as described in U.S. Pat. No. 5,338,477, and acrylic acid/acrylamide/acrylamidomethanesulfonic acid terpolymers), GE Betz (e.g., acrylic acid/polyethyleneglycol allyl ether copolymers, acrylic acid/allyloxy-2-hydroxypropylsulfonic acid (or AHPSE)/polyethyleneglycol allyl ether terpolymers, and acrylic acid/AHPSE copolymers), Chemtreat [e.g., allyoxybenzenesulfonic acid (~3.5 mole %)/methallyl sulfonic acid (~2.5 mole %)/methyl methacrylate (13-18 mole %)/acrylic acid (76-81 mole %) quad-polymers], Ciba, SNF Floerger, Rhone-Poulenc, Stockhausen, Hercules, Henkel, Allied Colloids, Hoechst Celanese, Ashland Chemical Company, Kurita Water Industries Ltd, Nippon Shokubai Co., and other suppliers.

Additional water-soluble polymers that may be used in a heat transfer fluid concentrate in accordance with the present teachings include but are not limited to those described in the following U.S. Pat. Nos. 3,085,916; 3,578,589; 3,709,815; 3,806,367; 4,499,002; 4,510,059; 4,532,048; 4,563,284; 4,566,973; 4,566,974; 4,640,793; 4,707,271; 4,762,621; 4,784,774; 4,885,097; 4,952,326; 4,952,327; 5,023,001; 5,658,465; 6,361,768B1; 4,556,493; 4,581,145; 4,457,847; 4,703,092; 4,801,388; 4,919,821; 4,929,425; 5,035,806; 5,049,310; 5,080,801; 5,128,419; 5,167, 828; 5,171,459; 5,213,691; 5,216,086; 5,260,386; 5,422,408; 5,403,493; 5,534,611; 5,726,267; 5,736,405; 5,776,875; 5,750,070; 5,788,866; 5,858,244; 5,876,623; 6,005,040; 6,017,994; 6,022,401; 6,153,106; 6,225,430B1; 6,232,419B1; 6,312,644B1; 6,344,531B1; 6,380,431B1; 6,426,383B1; 6,440,327B1; 6,461,518B1; 6,645,428B1; 7,115,254B1; 4,443,340; 4,659,480; 4,659,482; 4,913,822; 4,929,362; 4,929,695; 4,931,206; 4,944,885; 5,030,748; 5,078,891; 5,100,558; 5,102,555; 5,108,619; 5,128,427; 5,139,643; 5,147,555; 5,158,622; 5,158,685; 5,169,537; 5,180,498; 5,194,620; 5,211,845; 5,234,604; 5,248,438; 5,242,599; 5,256,302; 5,264,155; 5,271,847; 5,271,862; 5,282,905; 5,320,757; 5,332,505; 5,342,540; 5,350,536; 5,374,336; 5,378,327; 5,378,372; 5,393,456; 5,445,758; 5,512,183; 5,518,630; 5,527,468; 5,575,920; 5,601,754; 6,228,950B1; 6,444,747B1; 6,641,754B2; 4,517,098; 4,530,766; 4,711,725; 5,055,540; 5,071,895; 5,185,412; 5,223,592; 5,277,823; 5,342,787; 5,395,905; 5,401,807; 5,420,211; 5,451,644; 5,457,176; 5,516,432; 5,531,934; 5,552,514; 5,554,721; 5,556,938; 5,597,509; 5,601,723; 5,658,464; 5,755,972; 5,866,664; 5,929,098; 6,114,294; 6,197,522B1; 6,207,780B1; 6,218,491B1; 6,251,680B1; 6,335,404B1; 6,395,185; 5,023,368; 5,547,612; 5,650,473; 5,654,198; 5,698,512; 5,789,511; 5,866,012; 5,886,076; 5,925,610; 6,040,406; 6,995,120B2; 7,087,189B2; 5,346,626; 5,624,995; 5,635,575; 5,716,529; 5,948,268; 6,001,264; 6,162,391; 6,368,552B1; 6,656,365B2; 6,645,384B1; 5,000,856; 5,078,879; 5,087,376; 5,124,046; 5,153,390; 5,262,061; 5,322,636; 5,338,477; 5,378,368; 5,391,303; 5,407,583; 5,454,954; 5,534,157; 5,707,529; 6,691,715B2; 6,869,998B2; 4,372,870; 5,124,047; 4,797,224; 4,485,223; 5,254,286; 4,460,477; 5,015,390; 4,933,090; 4,868,263; 4,895,664; 4,895,916; 5,000,856; 4,900,451; 4,584,105; 4,872,995;

4,711,726; 4,851,490; 4,849,129; 4,589,985; 4,847,410; 4,657,679; 4,801,387; 4,889,637; 4,604,211; 4,710,303; 4,589,985; 4,324,664; 3,752,760; 4,740,314; 4,647,381; 4,836,933; 4,814,406; 4,326,980; 4,008,164; 5,246,332; and 5,187,238. Additional water-soluble polymers that may be used in a heat transfer fluid concentrate in accordance with the present teachings include but are not limited to those described in the following European patents: EP 0,297, 049B1; EP 0360746B1; and EP 0,879,794B1. Additional water-soluble polymers that may be used in a heat transfer fluid concentrate in accordance with the present teachings include but are not limited to those described in the following U.S. patent application publications: 2006/0191852A1; 2005/0202995A1; 2002/0195583A1; 2004100225093A1; 200510009959A1; and 2005/0092211A1.

In some embodiments, the water-soluble polymer used in a heat transfer fluid concentrate in accordance with the present teachings includes an acrylate-based polymer. Representative acrylate-based polymers suitable for use in accordance with the present teachings include but are not limited to acrylate-based homopolymer, acrylate-based copolymer, acrylate-based terpolymer, acrylate-based quadpolymer, and combinations thereof. In some embodiments, the acrylate-based polymer comprises polyacrylate. In some embodiments, to obtain optimal performance, the ratio of active acrylate-based polymer concentration to calcium ion concentration in the heat transfer fluid concentrate is greater than 4 and less than about 110. In some embodiments, the ratio of active acrylate-based polymer concentration to calcium ion concentration in the heat transfer fluid concentrates is greater than about 7 and less than about 80.

The pH of heat transfer fluid is between 6.8 and 9.5. Preferably, the pH of the 50 vol. % aqueous solution of the heat transfer fluid is between 7 and 9.0. In some embodiments, a pH of a heat transfer fluid concentrate in accordance with the present teachings is between about 6.8 and about 9.5. In other embodiments, the pH is between about 7.0 and about 9.0. In some embodiments, the pH of a ready-to-use 50 vol. % aqueous solution of the heat transfer fluid concentrate is between about 6.8 and about 9.5 and, in other embodiments, between about 7.0 and about 9.0.

Heat transfer fluid concentrates in accordance with the present teachings may optionally further include one or a plurality of phosphonocarboxylates. Phosphonocarboxylates are phosphonated compounds having the general formula (2)

$$H[CHRCHR]_n\text{---}PO_3M_2 \qquad (2)$$

wherein at least one R group in each unit is a COOM, $CH_2OH$, sulphono or phosphono group, and the other R group—which may be the same as or different than the first R group—is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group; wherein n is 1 or an integer greater than 1; and wherein each M is hydrogen or an alkali metal ion such as a sodium ion, potassium ion and the like. Furthermore, at least one COOM group will be present in one of the R groups. In some embodiments, the phosphonocarboxylates are phosphonated oligomers or mixture of phosphonated oligomers of maleic acid of the formula (3)

$$H[CH(COOM)CH(COOM)]_n\text{---}PO_3M_2 \qquad (3)$$

wherein n is 1 or an integer greater than 1, and M is a cationic species (e.g., alkali metal cations) such that the compound is water-soluble. Representative phosphonocarboxylates include but are not limited to phosphonosuccinic acid, 1-phosphono-1,2,3,4-tetracarboxybutane, and 1-phosphono-1,2,3,4,5,6-hexacarboxyhexane. The phosphonocarboxylates may be a mixture of compounds having the formula (3) with differing values for "n". The mean value of "n" may be 1 to 2 or, in some embodiments, 1.3 to 1.5. The synthesis of the phosphonocarboxylates is known and described in U.S. Pat. No. 5,606,105. The phosphonocarboxylates are separate and different from the carboxylates described above.

In a heat transfer fluid concentrate in accordance with the present teachings, a phosphonocarboxylate may optionally be present in an amount ranging from about 10 ppm to about 500 ppm based on the total weight of the heat transfer fluid concentrate. Within this range, the phosphonocarboxylate may be present in an amount greater than or equal to about 20 ppm and, in some embodiments, greater than or equal to about 40 ppm. Also within this range, the phosphonocarboxylate may be present in an amount less than or equal to about 400 ppm and, in some embodiments, less than or equal to about 300 ppm. In some embodiments, a heat transfer fluid concentrate in accordance with the present teachings is free of any phosphonocarboxylate.

Heat transfer fluid concentrates in accordance with the present teachings may optionally further include one or a plurality of phosphinocarboxylates. Phosphinocarboxylates are compounds having the general formula (4)

$$H[CHR^1CHR^1]_n\text{---}P(O_2M)\text{-}[CHR^2CHR^2]_mH \qquad (4)$$

wherein at least one $R^1$ group in each unit is a COOM, $CH_2OH$, sulphono or phosphono group and the other $R^1$ group—which may be the same as or different than the first $R^1$ group—is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group; wherein n is an integer equal to or greater than 1; and wherein each M is hydrogen or an alkali metal ion such as a sodium ion, potassium ion, and the like. Similarly, at least one $R^2$ group in each unit is a COOM, $CH_2OH$, sulphono or phosphono group and the other $R^2$ group—which may be the same as or different than the first $R^2$ group—is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group; and wherein m is an integer equal to or greater than 0. Furthermore, at least one COOM group will be present in one of the $R^1$ and $R^2$ groups. Representative phosphinocarboxylates include but are not limited to phosphinicosuccinic acid and water-soluble salts thereof, phosphinicobis(succinic acid) and water-soluble salts thereof, and phosphinicosuccinic acid oligomer and salts thereof as described in U.S. Pat. Nos. 6,572,789 and 5,018,577. The phosphonocarboxylates may be a mixture of compounds having the formula (4) with differing values for "n" and "m". The phosphinocarboxylates are separate and different from the carboxylates described above.

In a heat transfer fluid concentrate in accordance with the present teachings, a phosphinocarboxylate may optionally be present in an amount ranging from about 10 ppm to about 500 ppm based on the total weight of the heat transfer fluid concentrate. Within this range, the phosphinocarboxylate may be present in an amount greater than or equal to about 20 ppm and, in some embodiments, greater than or equal to 40 ppm. Also within this range, the phosphinocarboxylate may be present in an amount less than or equal to about 400 ppm and, in some embodiments, less than or equal to about 300 ppm. In some embodiments, a heat transfer fluid concentrate in accordance with the present teachings is free of any phosphinocarboxylate.

Heat transfer fluid concentrates in accordance with the present teachings may optionally further include molybdate ions. In some embodiments, the molybdate ions are derived from one or a plurality of salts of molybdic acid (e.g., water-soluble molybdate salts). Representative salts of molybdic acid include alkali metal molybdates, alkaline earth metal molybdates, and combinations thereof. Representative molybdates suitable for use as an optional additive in a heat transfer fluid concentrate in accordance with the present teachings include but are not limited to sodium molybdate, potassium molybdate, calcium molybdate, magnesium molybdate, lithium molybdate, and/or the like, and combinations thereof. In addition, hydrates of alkali metal molybdates and/or alkaline earth metal molybdates (e.g., sodium molybdate di-hydrate) may also be used. In some embodiments, if molybdate ions are optionally present in a heat transfer fluid concentrate in accordance with the present teachings, the molybdate ions are not derived from lithium molybdate, calcium molybdate, and/or magnesium molybdate. In some embodiments, a heat transfer fluid concentrate in accordance with the present teachings does not include lithium molybdate, calcium molybdate, and/or magnesium molybdate.

Heat transfer fluid concentrate in accordance with the present teachings may optionally further include one or more additional components. Representative additional components that may optionally be present in a heat transfer fluid concentrate in accordance with the present teachings include but are not limited to colorants, antifoaming agents or defoamers, pH-adjusting agents, phosphonates (e.g., AMP or aminotrimethylene phosphonic acid; HEDP or 1-hydroxy ethylidene-1,1-diphosphonic acid; PBTC or 2-butane phosphono-1,2,4-tricarboxylic acid; PCAM or phosphono carboxylate acid mixture; and/or Bricorr 288, which is a mixture of sodium salts of organophosphonic acid H—[CH(COONa)CH(COONa)]$_n$—PO$_3$Na$_2$, where n<5 and n$_{mean}$=1.4), phosphinates (e.g., PSO or phosphinic acid oligomers, which is a mixture of mono-, bis-, and oligomeric phosphinosuccinic acid adduct), water-soluble molybdate salts, lithium salts, nitrites, biocides, polymer dispersants, scale inhibitors, surfactants, bittering agents, additional corrosion inhibitors, other coolant/antifreeze additives, and/or the like, and combinations thereof. In some embodiments, a heat transfer fluid concentrate in accordance with the present teachings may specifically exclude one or more of these optional additional components.

Representative colorants or dyes suitable for use in a heat transfer fluid concentrate in accordance with the present teachings include but are not limited to "Uranine Yellow," "Uranine Dye," "Alizarine Green," "Chromatint Orange 1735" or "Green AGS liquid" from Abbeys Color Inc., or Chromatech Incorporated, "Chromatint Yellow 0963 Liquid Dye," "Chromatint Yellow 2741 Liquid Dye," "Chromatint Green 1572 dye," "Chromatint Green 2384 Dye," "Chromatint Violet 1579 Dye" from Chromatech Incorporated, "Acid Red #52" or Sulforhodamine B from Tokyo Chemical Industry Co. or TCI America, "Orange II (acid Orange 7)" or "Intracid Rhodamine WT (Acid Red 388) from Sensient Technologies or other suppliers.

Representative antifoaming agents or defoamers suitable for use in a heat transfer fluid concentrate in accordance with the present teachings include but are not limited to "PM-5150" available from Prestone Products Corp., "Pluronic L-61" from BASF Corp., "Patcote 492" and other Patcote-branded antifoam available from Hydrite Chemical Co. and other suppliers, and "Foam Ban 136W" and other Foam Ban antifoams available from Munzing Chemie GmbH or affiliated companies. The optional antifoam agents may also include polydimethylsiloxane emulsion-based antifoams, including but not limited to PC-5450NF from Performance Chemicals, LLC in Boscawen, N.H.; and CNC antifoam XD-55 NF and XD-56 from CNC International in Woonsocket in R.I. In some embodiments, the optional antifoam agents may include a silicone, for example, SAG brand of silicone-based antifoams from Momentive Performance Materials Inc. in Waterford, N.Y., Dow Corning and other suppliers; an ethylene oxide-propylene oxide (EO-PO) block copolymer and a propylene oxide-ethylene oxide-propylene oxide (PO-EO-PO) block copolymer (e.g., Pluronic L61, Pluronic L81, and other Pluronic and Pluronic C products); poly(ethylene oxide) or poly(propylene oxide), for example, PPG 2000 (e.g., polypropylene oxide with an average molecular weight of 2000 Daltons); polydiorganosiloxane-based products (e.g., products containing polydimethylsiloxane (PDMS), and the like); fatty acids or fatty acid esters (e.g., stearic acid, and the like); a fatty alcohol, an alkoxylated alcohol and a polyglycol; a polyether polyol acetate, a polyether ethoxylated sorbital hexaoleate, and a poly(ethylene oxide-propylene oxide)monoallyl ether acetate; a wax, a naphtha, kerosene, and an aromatic oil; and/or the like; and combinations thereof.

Representative biocides suitable for use in a heat transfer fluid concentrate in accordance with the present teachings include but are not limited to various non-oxidizing biocides, such as glutaraldehyde, isothiazolin, 5-chloro-2-methyl-4-isothiazolin-3-one, 2-methyl-4-isothiazolin-3-one, 1,2-benzisothiazolin-3-one, 2,2-dibromo-3-nitrilopropionamide, 2-bromo-2-nitropropane-1,3-diol, methylene bis(thiocynate), terbuthylazine, tetrakis(hydroxymethyl) phosphonium sulphate, and/or the like, and combinations thereof.

Representative pH-adjusting agents suitable for use in a heat transfer fluid concentrate in accordance with the present teachings include but are not limited to alkali or alkaline earth metal hydroxides or oxides (e.g., sodium hydroxide, potassium hydroxide), inorganic phosphates (e.g., sodium phosphate, potassium phosphate, sodium pyrophosphate, and potassium pyrophosphate), and/or the like, and combinations thereof.

Heat transfer fluid concentrates in accordance with the present teachings may optionally further include corrosion inhibitors for copper and copper alloys. Representative copper and copper alloy corrosion inhibitors include but are not limited to compounds containing a 5- or 6-membered heterocyclic ring as the active functional group, wherein the heterocyclic ring contains at least one nitrogen atom (e.g., an azole compound of a type described above). In some embodiments, a copper and copper alloy corrosion inhibitor includes a hydrodrobenzotriazole, such as tetrohydrobenzotriazole (e.g., 4,5,6,7-tetrahydro-benzotriazole), tetrahydrotolytriazole (which may be 4-methyl-1H-benzontriazole, 5-methyl-1H-benzotriazole, and other tetrahydrobenzotriazoles as described in U.S. Pat. No. 8,236,205 B1), and/or the like, and combinations thereof; sodium or potassium salts of the above-mentioned azole compounds, and/or the like, and combinations thereof. The copper and copper alloy corrosion inhibitors may be present in the composition in an amount of about 0.01 wt. % to about 2 wt. %.

Representative non-ionic surfactants suitable for use in a heat transfer fluid concentrate in accordance with the present teachings include but are not limited to fatty acid esters, such as sorbitan fatty acid esters, polyalkylene glycols, polyalkylene glycol esters, copolymers of ethylene oxide (EO) and propylene oxide (PO), polyoxyalkylene derivatives of a sorbitan fatty acid ester, and/or the like, and combinations thereof. In some embodiments, the average molecular weight of the non-ionic surfactants is between about 55 and about 300,000 and, in some embodiments, between about 110 and about 10,000. Representative sorbitan fatty acid esters include but are not limited to sorbitan monolaurate (e.g., sold under the tradename Span® 20, Arlacel® 20, S-MAZ® 20M1), sorbitan monopalmitate (e.g., Span® 40 or Arlacel® 40), sorbitan monostearate (e.g., Span® 60, Arlacel® 60, or S-MAZ® 60K), sorbitan monooleate (e.g., Span® 80 or Arlacel® 80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), and sorbitan monotallate (e.g., S-MAZ® 90). Representative polyalkylene glycols include but are not limited to polyethylene glycols, polypropylene glycols, and combinations thereof. Representative polyethylene glycols include but are not limited to CARBOWAX™ polyethylene glycols and methoxypolyethylene glycols from Dow Chemical Company (e.g., CARBOWAX PEG 200, 300, 400, 600, 900, 1000, 1450, 3350, 4000 & 8000, etc.) or PLURACOL® polyethylene glycols from BASF Corp. (e.g., Pluracol® E 200, 300, 400, 600, 1000, 2000, 3350, 4000, 6000 and 8000, etc.). Representative polyalkylene glycol esters include but are not limited to mono- and di-esters of various fatty acids, such as MAPEG® polyethylene glycol esters from BASF (e.g., MAPEG® 200ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.). Representative copolymers of ethylene oxide (EO) and propylene oxide (PO) include but are not limited to various Pluronic and Pluronic R block copolymer surfactants from BASF, DOWFAX non-ionic surfactants, UCON™ fluids and SYNALOX lubricants from DOW Chemical. Representative polyoxyalkylene derivatives of a sorbitan fatty acid ester include but are not limited to polyoxyethylene 20 sorbitan monolaurate (e.g., products sold under the tradenames TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitant monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K), and/or the like, and combinations thereof.

In some embodiments, heat transfer fluid concentrates in accordance with the present teachings may be used in cooling systems and may provide corrosion inhibition properties. In some embodiments, a heat transfer fluid concentrate in accordance with the present teachings contains one or more $C_6$-$C_{20}$ mono- and/or di-basic aliphatic or aromatic carboxylic acids or salts thereof, a water-soluble orthophosphate salt or phosphoric acid, a low concentration of a water-soluble calcium salt (e.g., an amount configured to provide calcium ion in a concentration ranging from about 1 mg/L to about 60 mg/L), one or more azole compounds, and at least one or more calcium ion stabilizers selecting from the following: (1) acrylate-based homopolymers, copolymers, terpolymers, quad-polymers, or combinations thereof; (2) optionally one or more components selecting from the following groups: (a) phosphonocarboxylate (e.g., Bricorr 288); (b) phosphinocarboxylate compounds (e.g., PSO); (c) 1,2,3,4-butane tetra-carboxylic acid; (d) aconitic acid; and (e) DC Q1-6083 (e.g., O1.5SiCH2CH2CH2OP(O)(CH3)ONa). In some embodiments, the ratio of active acrylate-based polymer concentration to calcium ion concentration in a heat transfer fluid concentrate in accordance with the present teachings is greater than about 4 and less than about 110. In some embodiments, the pH of a heat transfer fluid concentrate in accordance with the present teachings at 50% concentration is between about 7.2 and about 9.0. In some embodiments, a heat transfer fluid concentrate in accordance with the present teachings is free from silicate, borate, and amines. In some embodiments, the heat transfer fluid concentrate and heat transfer fluid is free of acetate. In some embodiments, the nitrate content is less than 50 ppm by weight based on the total weight of the heat transfer fluid concentrate or heat transfer fluid.

In some embodiments, a heat transfer fluid concentrate in accordance with the present teachings is a single-phase, homogeneous solution at room temperature. In some embodiments, a heat transfer fluid concentrate in accordance with the present teachings is storage stable at a temperature between about −10° C. and +100° C. In some embodiments, a heat transfer fluid concentrate and/or a ready-to-use heat transfer fluid derived therefrom (e.g., by dilution) will meet the properties and performance requirements of ASTM D3306.

In some embodiments, a heat transfer fluid concentrate in accordance with the present teachings may be diluted (e.g., with water) to form a heat transfer fluid. For example, in some embodiments, the heat transfer fluid concentrate may be diluted by about 10 vol. % to about 75 vol. % to form a heat transfer fluid. In some embodiments, the water used for dilution is deionized water as described in Section 4.5 of ASTM D3306-10.

In some embodiments, heat transfer fluid concentrate in accordance with the present teachings may be provided as a commercially available product. In other embodiments, a ready-to-use heat transfer fluid in which the heat transfer fluid concentrate has been pre-diluted to around 50 vol. % with water may be provided as a commercially available product. In preparing a ready-to-use heat transfer fluid by dilution, the optimal level of water added to the heat transfer concentrate at use conditions may be determined by the desired freeze-up, boil-over, and corrosion protection requirements.

Heat transfer fluid concentrate that has not been diluted by adding water is typically not used in an engine cooling system as a heat transfer fluid due to its relatively low heat transfer coefficient (or specific heat), high viscosity, and high freeze point. Thus, heat transfer fluid concentrates may be diluted (e.g., to 40 vol. % to 60 vol. % solutions) by adding water before being used in engine cooling systems as heat transfer fluids. Vehicle manufacturers typically use 50 vol. % heat transfer concentrate diluted by water as factory fill fluid in vehicle cooling systems. Heat transfer fluid products that are pre-diluted by water to contain about 40 vol. % to about 60 vol. % heat transfer fluid concentrate are ready-to-use coolants because no additional water is needed when they are added into a vehicle cooling system.

In a ready-to-use heat transfer fluid, the freezing point depressant may be present in an amount of about 1 wt. % to less than about 90 wt. %, based on the total weight of the ready-to-use heat transfer fluid. Within this range, the amount of the freezing point depressant may be greater than or equal to about 30 wt. %, greater than or equal to about 40 wt. %, greater than or equal to about 50 wt. %, greater than or equal to about 55 wt. %, greater than or equal to about 60 wt. %, greater than or equal to about 70 wt. %, greater than or equal to about 75 wt. %, greater than or equal to about 80 wt. %, greater than or equal to about 85 wt. %, greater than or equal to about 86 wt. %, greater than or equal to about 87 wt. %, greater than or equal to about 88 wt. %, or greater than or equal to about 89 wt. %, but less than about 90 wt. % based on the total weight of the ready-to-use heat transfer fluid. Also, within this range, the amount of the freezing point depressant may be less than or equal to about 30 wt. %, less than or equal to about 40 wt. %, less than or equal to about 50 wt. %, less than or equal to about 55 wt. %, less than or equal to about 60 wt. %, less than or equal to about 70 wt. %, less than or equal to about 75 wt. %, less than or equal to about 80 wt. %, less than or equal to about 85 wt. %, less than or equal to about 86 wt. %, less than or equal to about 87 wt. %, less than or equal to about 88 wt. %, or less than or equal to about 89 wt. %, but more than about 1 wt. % based on the total weight of the ready-to-use heat transfer fluid.

In the ready-to-use heat transfer fluid, the carboxylate may be present in an amount of about 0.5 wt. % to about 8 wt. %, based on the total weight of the ready-to-use heat transfer fluid. Within this range, the amount may be greater than or equal to about 0.6 wt. %, or, in some embodiments, greater than or equal to about 0.7 wt. %. Also within this range, the amount may be less than or equal to about 7 wt. %, or, in some embodiments, less than or equal to about 6 wt. %.

In the ready-to-use heat transfer fluid, the inorganic phosphate may be present in an amount of about 0.01 wt. % to about 5 wt. % (e.g., about 0.05 wt. % to about 0.4 wt. %) based on the total weight of the ready-to-use heat transfer fluid. Within this range, the amount may be greater than or equal to about 0.07 wt. %, or, in some embodiments, greater than or equal to about 0.08 wt. %. Also within this range, the amount may be less than or equal to about 0.35 wt. %, or, in some embodiments, less than or equal to about 0.30 wt. %.

In the ready-to-use heat transfer fluid, the azole compound may be present in an amount of about 0.005 wt. % to about 2 wt. %, based on the total weight of the ready-to-use heat transfer fluid. Within this range, the azole compound may be present in an amount greater than or equal to about 0.007 wt. %, or, in some embodiments, greater than or equal to about 0.01 wt. %. Also within this range, the azole compound may be present in an amount less than or equal to about 1.5 wt. %, or, in some embodiments, less than or equal to about 1 wt. %.

In the ready-to-use heat transfer fluid, the calcium compound may be present in an amount such that the ready-to-use heat transfer fluid has a calcium ion concentration of greater than about 0.5 ppm based on the total weight of the ready-to-use heat transfer fluid. Within this range, the amount of calcium ions may be less than about 60 ppm. Also within this range, the amount of calcium ions may be less than or equal to about 40 ppm.

In the ready-to-use heat transfer fluid, the magnesium compound may be present in an amount such that the ready-to-use heat transfer fluid has a magnesium ion concentration of 2 to 60 parts per million by weight (ppm) of the heat transfer fluid. Within this range, the magnesium ion concentration can be greater than or equal to 4 ppm, or, more specifically, greater than or equal to 6 ppm. Also within this range, the magnesium ion concentration can be less than or equal to 65 ppm, or, more specifically, less than or equal to 60 ppm.

In the ready-to-use heat transfer fluid, the lithium compound may be present in an amount such that the heat transfer fluid has a lithium ion concentration of 20 to 1800 parts per million by weight (ppm) of the heat transfer fluid. Within this range, the lithium ion concentration can be less than or equal to 1200 ppm, or more specifically, less than or equal to 900 ppm. Also within this range, the lithium ion concentration can be greater than or equal to 30 ppm, or more specifically, greater than or equal to 65 ppm.

The pH of the ready-to-use heat transfer fluid may be between about 7.0 and about 9.5 at room temperature. Within this range, the pH may be greater than or equal to about 7.5 or, in some embodiments, greater than or equal to about 7.8. Also within this range, the pH may be less than or equal to about 9.0 or, in some embodiments, less than or equal to about 8.8.

A method of preventing corrosion in accordance with the present teachings includes contacting a ready-to-use heat transfer fluid of a type described herein with a heat transfer system. The heat transfer system may include one or a plurality of components made by controlled atmosphere brazing (i.e., CAB). In some embodiments, the heat transfer system may include aluminum.

It is also contemplated that in some applications, such as heavy duty engines, it may be desirable to incorporate one or more additional corrosion inhibitors (e.g., including but not limited to nitrites, molybdates, and/or the like, salts thereof, and combinations thereof).

The ready-to-use heat transfer fluid is further demonstrated by the following non-limiting examples. The following examples illustrate features in accordance with the present teachings, and are provided solely by way of illustration. They are not intended to limit the scope of the appended claims or their equivalents.

Examples

The examples were made using the materials shown in Table 4.

TABLE 4

Materials.

| Component | Description |
| --- | --- |
| EG | Ethylene glycol |
| Na tolyltriazole | 50 wt. % solution of sodium tolyltriazole |
| Na hydroxide | 50 wt. % solution of sodium hydroxide |
| Neodecanoic acid | Neodecanoic acid |
| 2-ethyl hexanoic acid | 2-ethyl hexanoic acid |
| PM-5150 | An anti-foam EMCO |
| $H_3PO_4$ | A 75 wt. % of $H_3PO_4$ |
| DI $H_2O$ | Deionized water |
| Mg(NO3)$_2$*6$H_2O$ | Hexahydrated magnesium nitrate; (MW = 256.30) |
| Mg(Ac)$_2$*4$H_2O$ | Tetrahydrated magnesium acetoacetate; (MW = 214.45) |
| Ca(Ac)$_2$*$H_2O$ | Tetrahydrated calcium acetoacetate; (MW = 176.18) |
| AR-940 | Sodium polyacrylate (MW = 2600) aqueous solution, 40% solid, pH = 8.3 |
| Acumer 3100 | AA/AM/AMPS terpolymer, (MW = 4500), 43.5% solid, pH = 2.1-3.0 |
| Acumer 4161 | Phosphino polycarboxylic acid, (MW = 3600), 51% solid, pH = 3.3 |
| BTCA | 1,2,3,4-butane tetracarboxylic acid |
| SAM H-90 | Mixture of 4- and 5-methyl benzotriazole (or tolytriazole), benzotriazole, and tetrahydro tolytriazole in water (Wincom Inc.) |

The concentrate compositions shown in Tables 5 and 6 were made by mixing the listed ingredients and less than 0.03 weight percent of a dye. The concentrate was diluted to 25 volume percent with deionized water and 100 ppm of chloride was added. A modified GM9066P test was run on the diluted solution using sand cast aluminum 319 at a temperature of 263±3 degrees Fahrenheit. Results are shown below in Tables 5 and 6.

TABLE 5

Synergistic effect - Ca, Mg, Polymer and PO4 - Modified GM9066P Test Results for OAT coolants containing phosphate

| | Description | | | | | | | | |
|---|---|---|---|---|---|---|---|---|---|
| | | Ca only | Mg and Polyacrylate only, no Ca | Mg and Polyacrylate only, no Ca | Mg and Polyacrylate + AC 3100 only, no Ca | Mg and Polyacrylate + AC 3100 only, no Ca | Mg and Polyacrylate + AC 4161 only, no Ca | Ca, Mg and Polyacrylate | Ca, Mg and Polyacrylate |
| | | | | | Coolant ID | | | | |
| Ingredients | Comp Ex. 1a wt % | Comp Ex. 1c wt % | Ex. 1 wt % | Ex. 2 wt % | Ex. 3 wt % | Ex. 4 wt % | Ex. 5 wt % | Ex. 6 wt % | Ex. 7 wt % |
| Ethylene Glycol | 93.12 | 92.91 | 93.48 | 94.42 | 93.42 | 93.43 | 93.56 | 93.49 | 93.48 |
| SAM H-90 | | | | | | | | | |
| Sodium Tolytriazole, 50% | 0.47 | 0.47 | 0.48 | 0.48 | 0.48 | 0.47 | 0.48 | 0.48 | 0.47 |
| Sodium Hydroxide, 50% | 2.19 | 2.28 | 2.08 | 2.07 | 2.07 | 2.05 | 2.00 | 2.03 | 2.06 |
| Potassium Hydroxide, 45% | | | | | | | | | |
| Neo Decanoic Acid | 0.96 | 0.96 | 0.85 | 0.90 | 0.90 | 0.89 | 0.86 | 0.86 | 0.86 |
| 2-Ethyl Hexanoic acid | 2.87 | 2.87 | 2.56 | 2.70 | 2.70 | 2.68 | 2.58 | 2.58 | 2.58 |
| Dye | 0.02 | | | | | | | | |
| Uranine Yellow Dye, 40% | | 0.00 | 0.00 | 0.00 | 0.00 | 0.00 | 0.00 | 0.00 | 0.00 |
| PM-5150 | 0.20 | 0.20 | 0.18 | 0.19 | 0.19 | 0.19 | 0.18 | 0.18 | 0.18 |
| H3PO4, 75%. | 0.17 | 0.25 | 0.26 | 0.17 | 0.17 | 0.17 | 0.26 | 0.26 | 0.25 |
| Mg(NO3)2*6H2O, MW = 256.30 | | | | | | 0.03 | | | |
| Mg(Ac)2*4H2O, MW = 214.45 | | | 0.03 | 0.03 | 0.03 | | 0.02 | 0.02 | 0.02 |
| DI H2O | | 0.05 | 0.03 | 0.03 | 0.03 | 0.03 | 0.02 | 0.03 | 0.03 |
| Ca(Ac)2*H2O, MW = 176.18 | | 0.013 | | | | | | 0.002 | 0.002 |
| AR-940, Sodiume polyacrylate (MW = 2600) aqueous solution, 40% solid, pH = 8.3 | | | 0.06 | 0.02 | 0.01 | 0.04 | 0.04 | 0.07 | 0.07 |
| Acumer 3100, AA/AM/AMPS terpolymer, Mw = 4500, 43.5% solid, pH 2.1-3.0 | | | | | 0.01 | 0.01 | | | |
| Acumer 4161, Phosphino polycarboxylic acid, Mw = 3600, 51% solid, pH 3.3 | | | | | | | 0.02 | | |
| Bitterant, 40% in Ethylene Glycol | | | | | | | | | |
| Total, % | 100.00 | 100.00 | 100.00 | 100.00 | 100.00 | 100.00 | 100.00 | 100.00 | 100.00 |
| pH @ 50 v % | | | | | | | | 8.32 | 8.4 |
| Theorectical Mg cocnentration, mg/kg | 0.0 | 0.0 | 34.0 | 34.0 | 34.0 | 28.4 | 22.7 | 25.0 | 24.9 |
| Theorectical Ca cocnentration, mg/kg | 0.0 | 28.7 | 0.0 | 0.0 | 0.0 | 0.0 | 0.0 | 3.5 | 3.6 |
| ppm active Polyacrylate/ppm Mg | | | 7.1 | 1.8 | 1.2 | 5.6 | 6.2 | 11.2 | 11.2 |
| ppm active Polyacrylate/ppm Ca | | 0.0 | | | | | | 79.6 | 76.9 |
| Storage Stability, 100% Coolant concentrate, 100 C. | | | >4 weeks | | | >4 weeks | >4 weeks | >4 weeks | >4 weeks |
| Storage Stability, 50 v % Coolant, 100 C. | | | <1 week | | | | | <2 weeks | <2 weeks |
| Modified GM9066P - 25 v % Coolant + 100 ppm Cl, Sand cast Al319, 3.0 L engine; 263 ± 3 F. | | | | | | | | | |
| 1 hr LPR CorrRate, mpy @ 263 F. ± 3 F. | 9.85 | 9.16 | 0.44 | 0.71 | 0.96 | 0.43 | 0.44 | 0.76 | 0.60 |

TABLE 5-continued

Synergistic effect - Ca, Mg, Polymer and PO₄ - Modified GM9066P Test Results for OAT coolants containing phosphate

| | Description | | | | | | | | |
|---|---|---|---|---|---|---|---|---|---|
| | Ca only | Mg and Polyacrylate only, no Ca | Mg and Polyacrylate only, no Ca | Mg and Polyacrylate + AC 3100 only, no Ca | Mg and Polyacrylate + AC 3100 only, no Ca | Mg and Polyacrylate + AC 4161 only, no Ca | Ca, Mg and Polyacrylate | Ca, Mg and Polyacrylate |
| | | | | Coolant ID | | | | | |
| Ingredients | Comp Ex. 1a wt % | Comp Ex. 1c wt % | Ex. 1 wt % | Ex. 2 wt % | Ex. 3 wt % | Ex. 4 wt % | Ex. 5 wt % | Ex. 6 wt % | Ex. 7 wt % |
| 1 hr Ecorr, V/AgAgCl | −0.938 | −0.977 | −0.883 | −0.886 | −0.889 | −0.856 | −0.827 | −0.866 | −0.858 |
| 3 hr LPR CorrRate, mpy @263 F. ± 3 F. | 8.97 | 9.19 | 0.27 | 0.27 | 0.45 | 0.28 | 0.52 | 0.54 | 0.36 |
| 3 hr Ecorr, V/AgAgCl | −0.914 | −0.920 | −0.836 | −0.849 | −0.861 | −0.817 | −0.820 | −0.841 | −0.834 |
| 5 hr LPR CorrRate, mpy @ 263 F. ± 3 F. | 8.43 | 9.11 | 0.22 | 0.30 | 0.39 | 0.21 | 0.41 | 0.46 | 0.40 |
| 5 hr Ecorr, V/AgAgCl | −0.905 | −0.904 | 0.830 | −0.827 | −0.842 | −0.799 | −0.831 | −0.831 | −0.819 |

TABLE 6

Synergistic effect - Ca, Mg, Polymer and PO4 - Modified GM9066P Test Results for OAT coolants containing phosphate

| | Description | | | | | | | |
|---|---|---|---|---|---|---|---|---|
| | Polyacrylate only | Ca only | Ca and Polyacrylate only | Ca and Polyacrylate only | Ca and Polyacrylate only | Ca and Polyacrylate only | Ca and Polyacrylate only | Ca and Polyacrylate only |
| | | | | Coolant ID | | | | |
| Ingredients | Comp Ex. 1a wt % | Comp Ex. 1b wt % | Comp Ex. 1c wt % | Ex. 8 wt % | Ex. 9 wt % | Ex. 10 wt % | Ex. 11 wt % | Ex. 12 wt % |
| Ethylene Glycol SAM H-90 | 93.12 | 92.38 | 92.91 | 93.48 | 93.99 | 93.99 | 93.99 | 93.99 |
| Sodium Tolytriazole, 50% | 0.47 | 0.47 | 0.47 | 0.47 | 0.20 | 0.20 | 0.20 | 0.20 |
| Sodium Hydroxide, 50% Potassium Hydroxide, 45% | 2.19 | 2.57 | 2.28 | 2.04 | 1.90 | 1.90 | 1.90 | 1.90 |
| Neo Decanoic Acid | 0.96 | 0.95 | 0.96 | 0.86 | 0.77 | 0.77 | 0.77 | 0.77 |
| 2-Ethyl Hexanoic acid | 2.87 | 2.85 | 2.87 | 2.58 | 2.31 | 2.31 | 2.31 | 2.31 |
| Dye | 0.02 | 0.02 | | | | | | |
| Uranine Yellow Dye, 40% | | | 0.00 | 0.00 | 0.00 | 0.00 | 0.00 | 0.00 |
| PM-5150 | 0.20 | 0.20 | 0.20 | 0.18 | 0.20 | 0.20 | 0.20 | 0.20 |
| $H_3PO_4$, 75%. | 0.17 | 0.49 | 0.25 | 0.25 | 0.26 | 0.26 | 0.26 | 0.26 |
| $Mg(NO_3)_2*6H_2O$, MW = 256.30 | | | | | | | | |
| $Mg(Ac)_2*4H_2O$, MW = 214.45 | | | | | | | | |
| DI H2O | | | 0.05 | 0.05 | 0.28 | 0.22 | 0.23 | 0.29 |
| $Ca(Ac)_2*H_2O$, MW = 176.18 | | | 0.013 | 0.013 | 0.012 | 0.018 | 0.012 | 0.006 |
| AR-940, Sodiume polyacrylate (MW = 2600) aqueous solution, 40% solid, pH = 8.3 | | 0.07 | | 0.07 | 0.07 | 0.13 | 0.12 | 0.07 |
| Acumer 3100, AA/AM/AMPS terpolymer, Mw = 4500, 43.5% solid, pH 2.1-3.0 | | | | | | | | |
| Acumer 4161, Phosphino polycarboxylic acid, Mw = 3600, 51% solid, pH 3.3 | | | | | | | | |

TABLE 6-continued

Synergistic effect - Ca, Mg, Polymer and PO4 - Modified GM9066P Test Results for OAT coolants containing phosphate

| | | | | | | | | |
|---|---|---|---|---|---|---|---|---|
| Bitterant, 40% in Ethylene Glycol | | | | | 0.01 | 0.01 | 0.01 | 0.01 |
| Total, % | 100.00 | 100.00 | 100.00 | 100.00 | 100.00 | 100.00 | 100.00 | 100.00 |
| pH @ 50 v % | | | | 8.26 | 8.29 | 8.24 | 8.22 | 8.26 |
| Theoretical Mg concentration, mg/kg | 0.0 | 0.0 | 0.0 | 0.0 | 0.0 | 0.0 | 0.0 | 0.0 |
| Theoretical Ca concentration, mg/kg | 0.0 | 0.0 | 28.7 | 28.8 | 27.4 | 41.0 | 27.3 | 13.6 |
| ppm active Polyacrylate/ppm Mg | | | | | | | | |
| ppm active Polyacrylate/ppm Ca | | | 0.0 | 9.7 | 10.2 | 12.7 | 17.6 | 20.6 |
| Storage Stability, 100% Coolant concentrate, 100 C. | | | | >4 weeks | >4 weeks | | >4 weeks | >4 weeks |
| Storage Stability, 50 v % Coolant, 100 C. | | | | >4 weeks | >4 weeks | >2 weeks | >4 weeks | >4 weeks |
| Modified GM9066P - 25 v % Coolant + 100 ppm Cl, Sand cast Al319, 3.0 L engine; 263 ± 3 F. | | | | | | | | |
| 1 hr LPR CorrRate, mpy @ 263 F. ± 3 F. | 9.85 | 11.87 | 9.16 | 1.11 | 2.96 | 1.03 | 5.79 | 4.57 |
| 1 hr Ecorr, V/AgAgCl | −0.938 | −0.968 | −0.977 | −0.848 | −0.863 | −0.890 | −0.951 | −0.988 |
| 3 hr LPR CorrRate, mpy @263 F. ± 3 F. | 8.97 | | 9.19 | 0.94 | 2.30 | 1.35 | 3.74 | 7.61 |
| 3 hr Ecorr, V/AgAgCl | −0.914 | | −0.920 | −0.831 | −0.812 | −0.901 | −0.901 | −0.948 |
| 5 hr LPR CorrRate, mpy @ 263 F. ± 3 F. | 8.43 | | 9.11 | 1.04 | | | | |
| 5 hr Ecorr, V/AgAgCl | −0.905 | | −0.904 | −0.828 | | | | |

| | Description | | | | | |
|---|---|---|---|---|---|---|
| | Ca, Mg and Polyacrylate | Ca, Mg and Polyacrylate | Ca, Mg and Polyacrylate | Ca, Mg and Polyacrylate | Ca, Mg and Polyacrylate | Ca, Mg and Polyacrylate |
| | Coolant ID | | | | | |
| Ingredients | Ex. 13 wt % | Ex. 14 wt % | Ex. 15 wt % | Ex. 16 wt % | Ex. 17 wt % | Ex. 18 wt % |
| Ethylene Glycol | 93.56 | 93.99 | 93.40 | 93.99 | 93.99 | 94.02 |
| SAM H-90 | | | | | | 0.10 |
| Sodium Tolytriazole, 50% | 0.20 | 0.20 | 0.20 | 0.20 | 0.20 | |
| Sodium Hydroxide, 50% | 2.10 | 1.90 | 1.90 | 1.90 | 1.90 | 1.97 |
| Potassium Hydroxide, 45% | | | | | | |
| Neo Decanoic Acid | 0.86 | 0.77 | 0.77 | 0.77 | 0.77 | 0.77 |
| 2-Ethyl Hexanoic acid | 2.58 | 2.31 | 2.31 | 2.31 | 2.31 | 2.31 |
| Dye Uranine Yellow | | | | | | |
| Dye, 40% | 0.00 | 0.00 | 0.00 | 0.00 | 0.00 | 0.00 |
| PM-5150 | 0.20 | 0.20 | 0.20 | 0.20 | 0.20 | 0.20 |
| H3PO4, 75%. | 0.26 | 0.26 | 0.26 | 0.25 | 0.26 | 0.26 |
| $Mg(NO_3)_2 \cdot 6H_2O$, MW = 256.30 | | | | | | |
| $Mg(Ac)_2 \cdot 4H_2O$, MW = 214.45 | 0.03 | 0.03 | 0.02 | 0.02 | 0.03 | 0.02 |
| DI H2O | 0.14 | 0.27 | 0.87 | 0.27 | 0.18 | 0.27 |
| $Ca(Ac)_2 \cdot H_2O$, MW = 176.18 | 0.005 | 0.005 | 0.003 | 0.003 | 0.005 | 0.002 |

TABLE 6-continued

Synergistic effect - Ca, Mg, Polymer and PO4 - Modified GM9066P Test Results for OAT coolants containing phosphate

| | | | | | | |
|---|---|---|---|---|---|---|
| AR-940, Sodiume polyacrylate (MW = 2600) aqueous solution, 40% solid, pH = 8.3 | 0.06 | 0.07 | 0.07 | 0.07 | 0.16 | 0.07 |
| Acumer 3100, AA/AM/AMPS terpolymer, Mw = 4500, 43.5% solid, pH 2.1-3.0 | | | | | | |
| Acumer 4161, Phosphino polycarboxylic acid, Mw = 3600, 51% solid, pH 3.3 | | | | | | |
| Bitterant, 40% in Ethylene Glycol | 0.01 | 0.01 | | 0.01 | 0.01 | 0.01 |
| Total, % | 100.00 | 100.00 | 100.00 | 100.00 | 100.00 | 100.00 |
| pH @ 50 v % | 8.39 | 8.27 | 8.39 | 8.22 | 8.24 | 8.3 |
| Theoretical Mg concentration, mg/kg | 34.0 | 29.5 | 24.9 | 24.8 | 29.5 | 24.9 |
| Theoretical Ca concentration, mg/kg | 11.4 | 11.4 | 6.6 | 5.7 | 11.4 | 3.9 |
| ppm active Polyacrylate/ppm Mg | 7.1 | 9.5 | 11.2 | 11.3 | 21.7 | 11.2 |
| ppm active Polyacrylate/ppm Ca | 21.1 | 24.6 | 42.4 | 49.2 | 56.3 | 72.4 |
| Storage Stability, 100% Coolant concentrate, 100 C. | >4 weeks | >4 weeks | >4 weeks | >4 weeks | >4 weeks | >4 weeks |
| Storage Stability, 50 v % Coolant, 100 C. | >2 weeks | >2 weeks | >4 weeks | >4 weeks | >4 weeks | >2 weeks |
| Modified GM9066P - 25 v % Coolant + 100 ppm Cl, Sand cast Al319, 3.0 L engine; 263 ± 3 F. | | 130 ± 2 C. | | | 130 ± 2 C. | |
| 1 hr LPR CorrRate, mpy @ 263 F. ± 3 F. | | 0.89 | | | 1.27 | 0.51 |
| 1 hr Ecorr, V/AgAgCl | | −0.859 | | | −0.794 | −0.848 |
| 3 hr LPR CorrRate, mpy @263 F. ± 3 F. | | 0.82 | | | 1.38 | 0.51 |
| 3 hr Ecorr, V/AgAgCl | | −0.840 | | | −0.758 | −0.823 |
| 5 hr LPR CorrRate, mpy @ 263 F. ± 3 F. | | 0.63 | | | 0.50 | 0.29 |
| 5 hr Ecorr, V/AgAgCl | | −0.833 | | | −0.816 | −0.830 |

The concentrate compositions shown in Table 7 were made by mixing the listed ingredients in the designated amounts.

TABLE 7

Examples of Heat Transfer fluids - Acetate Salts vs. Oxides and Hydroxides as Sources of Magnesium and Calcium Ions.

| | Example ID | | |
|---|---|---|---|
| Ingredients | A wt % | B wt % | C wt % |
| Ethylene Glycol | 94.26 | 94.27 | 94.27 |
| Neo Decanoic Acid | 0.77 | 0.77 | 0.77 |
| 2-Ethyl Hexanoic Acid | 2.31 | 2.31 | 2.31 |
| Sodium Hydroxide, 50% | 1.88 | 1.88 | 1.88 |
| Sodium Tolytriazole, 50% | 0.38 | 0.38 | 0.38 |
| DI H$_2$O | 0.04 | 0.06 | 0.06 |
| AR-940, Sodium polyacrylate (MW = 2600) aqueous solution, 40% solid, pH = 8.3 | 0.07 | 0.07 | 0.07 |
| H$_3$PO$_4$, 75% | 0.26 | 0.26 | 0.26 |
| Calcium acetate monohydrate, MW = 176.18 | 0.0050 | | |

TABLE 7-continued

Examples of Heat Transfer fluids - Acetate Salts vs. Oxides and Hydroxides as Sources of Magnesium and Calcium Ions.

| Ingredients | Example ID | | |
|---|---|---|---|
| | A wt % | B wt % | C wt % |
| Magnesium Acetate tetrahydrate, MW = 214.45 | 0.0261 | | |
| CaO, MW = 56.0774 | | 0.0016 | |
| MgO, MW = 40.3044 | | 0.0049 | |
| Ca(OH)$_2$, MW = 74.093 | | | 0.0021 |
| Mg(OH)$_2$, MW = 58.3197 | | | 0.0071 |
| Total, % | 100.00 | 100.00 | 100.00 |
| Calculated Mg$^{2+}$ concentration, mg/kg Mg$^{2+}$ | 29.57 | 29.72 | 29.56 |
| Calculated Ca$^{2+}$ concentration, mg/kg Ca$^{2+}$ | 11.42 | 11.79 | 11.52 |
| ppm Polyacrylate/ppm Mg$^{2+}$ | 9.50 | 9.44 | 9.49 |

The concentrates of Table 7 were diluted to 25 volume percent with deionized water and 100 ppm of chloride was added. A modified GM9066P test was run on the diluted solution using sand cast aluminum 319 at 135±0.5 degrees Celsius. Results are shown below in Table 8.

TABLE 8

Modified GM 9066P Test Results (3.0-L Sand Cast 319 Al Engine Block Corrosion - Heat Rejecting Surface, 25 vol. % coolant + 100 ppm Chloride, 135 ± 0.5° C.

| EXAMPLE ID | A | B | C |
|---|---|---|---|
| LPR CorrRate @ 1 hour at 135° C., mpy | 0.90 | 0.81 | 0.83 |
| Corrosion Potential @ 1 hour at 135° C., V vs. AgAgCl, 3M NaCl | −0.895 | −0.935 | −0.952 |
| LPR CorrRate @ 2 hours at 135° C., mpy | 0.69 | 0.44 | 0.48 |
| Corrosion Potential @ 2 hours at 135° C., V vs. AgAgCl, 3M NaCl | −0.894 | −0.913 | −0.917 |
| LPR CorrRate @ 3 hours at 135° C., mpy | 0.60 | 0.34 | 0.32 |
| Corrosion Potential @ 3 hours at 135° C., V vs. AgAgCl, 3M NaCl | −0.895 | −0.900 | −0.893 |
| LPR CorrRate @ 4 hours at 135° C., mpy | 0.51 | 0.27 | 0.29 |
| Corrosion Potential @ 4 hours at 135° C., V vs. AgAgCl, 3M NaCl | −0.895 | −0.882 | −0.871 |
| LPR CorrRate @ 5 hours at 135° C., mpy | 0.49 | 0.21 | 0.25 |
| Corrosion Potential @ 5 hours at 135° C., V vs. AgAgCl, 3M NaCl | −0.897 | −0.867 | −0.850 |

The entire contents of each and every patent and non-patent publication cited herein are hereby incorporated by reference, except that in the event of any inconsistent disclosure or definition from the present specification, the disclosure or definition herein shall be deemed to prevail.

It is to be understood that use of the indefinite articles "a" and "an" in reference to an element (e.g., "a carboxylate," "an inorganic phosphate," etc.) does not exclude the presence, in some embodiments, of a plurality of such elements.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A heat transfer fluid concentrate comprising:
   greater than 90 weight percent of a freezing point depressant;
   16 to 80 ppm of magnesium ions;
   an azole compound;
   an inorganic phosphate;
   a carboxylate; and
   an acrylate based polymer;
   wherein the weight ratio of acrylate based polymer to magnesium ions is 1 to 25;
   wherein nitrate, if present, is present in an amount of less than 50 ppm based on total weigh of the heat transfer fluid concentrate;
   wherein the heat transfer fluid concentrate has a pH of 7 to 9.5; and
   wherein the heat transfer fluid concentrate is free from silicate, borate and amines.

2. The heat transfer fluid concentrate of claim 1, further comprising calcium ions.

3. The heat transfer fluid concentrate of claim 1, further comprising 50 to 2000 ppm lithium ions.

4. The heat transfer fluid concentrate of claim 1, further comprising calcium ions and 50 to 2000 ppm lithium ions.

5. The heat transfer fluid concentrate of claim 1, wherein the acrylate based polymer comprises a phosphinopolyacrylate.

6. The heat transfer fluid concentrate of claim 1, further comprising one or more additional corrosion inhibitors selected from the group consisting of nitrites, molybdates, and salts thereof.

7. A heat transfer fluid comprising:
   less than 90 weight percent of a freezing point depressant;
   water;
   2 to 60 ppm of magnesium ions;
   an azole compound;
   an inorganic phosphate;
   a carboxylate;
   greater than 0.5 ppm of calcium ions; and
   an acrylate based polymer;
   wherein the weight ratio of acrylate based polymer to magnesium ions is 1 to 25;
   wherein nitrate, if present, is present in an amount of less than 50 ppm based on total weigh of the heat transfer fluid;
   wherein the heat transfer fluid has a pH of 7 to 9.5; and
   wherein the heat transfer fluid is free from silicate, borate and amines.

8. The heat transfer fluid of claim 7, wherein the heat transfer fluid comprises less than 60 ppm calcium ions.

9. The heat transfer fluid of claim 7, wherein the heat transfer fluid comprises less than 40 ppm calcium ions.

10. The heat transfer fluid of claim 7, further comprising 20 to 1800 ppm lithium ions.

11. The heat transfer fluid of claim 7, wherein the acrylate based polymer comprises a phosphinopolyacrylate.

12. The heat transfer fluid of claim 7, further comprising one or more additional corrosion inhibitors selected from the group consisting of nitrites, molybdates, and salts thereof.

13. A heat transfer fluid concentrate comprising:
greater than 90 weight percent of a freezing point depressant;
16 to 80 ppm of magnesium ions;
an azole compound;
an inorganic phosphate;
a carboxylate; and
an acrylate based polymer;
wherein the weight ratio of acrylate based polymer to magnesium ions is 1 to 25;
wherein the heat transfer fluid concentrate has a pH of 7 to 9.5;
and wherein the heat transfer fluid concentrate is free from silicate, borate, molybdate, and amines.

14. The heat transfer fluid concentrate of claim 13, further comprising calcium ions.

15. The heat transfer fluid concentrate of claim 13, further comprising 50 to 2000 ppm lithium ions.

16. The heat transfer fluid concentrate of claim 13, further comprising calcium ions and 50 to 2000 ppm lithium ions.

17. The heat transfer fluid concentrate of claim 13, wherein the acrylate based polymer comprises a phosphinopolyacrylate.

18. The heat transfer fluid concentrate of claim 13, further comprising one or more additional corrosion inhibitors selected from the group consisting of nitrites and salts thereof.

19. A heat transfer fluid comprising:
less than 90 weight percent of a freezing point depressant;
water;
2 to 60 ppm of magnesium ions;
an azole compound;
an inorganic phosphate;
a carboxylate;
greater than 0.5 ppm of calcium ions; and
an acrylate based polymer;
wherein the weight ratio of acrylate based polymer to magnesium ions is 1 to 25;
wherein the heat transfer fluid has a pH of 7 to 9.5; and
wherein the heat transfer fluid is free from silicate, borate, molybdate, and amines.

20. The heat transfer fluid of claim 19, wherein the heat transfer fluid comprises less than 60 ppm calcium ions.

21. The heat transfer fluid of claim 19, wherein the heat transfer fluid comprises less than 40 ppm calcium ions.

22. The heat transfer fluid of claim 19, further comprising 20 to 1800 ppm lithium ions.

23. The heat transfer fluid of claim 19, wherein the acrylate based polymer comprises a phosphinopolyacrylate.

24. The heat transfer fluid of claim 19, further comprising one or more additional corrosion inhibitors selected from the group consisting of nitrites, and salts thereof.

* * * * *